United States Patent Office — 3,177,204 — Patented Apr. 6, 1965

3,177,204
N-SUBSTITUTED 1,3-DIHYDRO-2H-AZEPIN-2-ONES
Leo A. Paquette, Portage Township, Kalamazoo County, Mich., assignor to The Upjohn Company, Kalamazoo, Mich., a corporation of Delaware
No Drawing. Filed Jan. 7, 1963, Ser. No. 249,614
37 Claims. (Cl. 260—239.3)

This invention relates to novel lactams and to processes for their preparation, and is more particularly concerned with novel N-substituted 1,3-dihydro-2H-azepin-2-ones of the formulas:

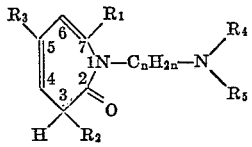

and

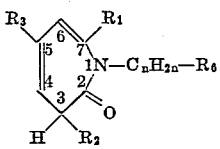

wherein $R_1$ and $R_2$ are alkyl of 1 to 4 carbon atoms, inclusive; wherein $R_3$ is selected from the group consisting of hydrogen and alkyl of 1 to 4 carbon atoms, inclusive; wherein $R_4$ and $R_5$ are selected from the group consisting of alkyl of 1 to 6 carbon atoms, inclusive, and alkenyl of ·3 to 6 carbon atoms, inclusive; wherein $R_6$ is selected from the group consisting of aziridinyl, azetidinyl, pyrrolidinyl, piperidino, hexahydroazepinyl, heptamethyleneimino, octamethyleneimino, morpholino, and thiomorpholino, each having attached as substituents on carbon atoms thereof zero to three alkyl groups, inclusive, each alkyl group being of 1 to 8 carbon atoms, inclusive; wherein $n$ is 2 to 6, inclusive; wherein the two N atoms in compounds of Formula I are separated by a chain of at least 2 carbon atoms; wherein the N and $R_6$ in compounds of Formula II are separated by a chain of at least 2 carbon atoms; and wherein the nitrogen atom of $R_6$ is attached to a carbon atom of $C_nH_{2n}$. $R_1$ and $R_2$ can be the same or different. When $R_3$ is alkyl, it can be the same as or different than $R_1$ or $R_2$. $R_4$ and $R_5$ can be the same or different. The alkyl groups which can be attached to $R_6$ can be different, or any two or all of them can be the same.

Examples of alkyl of 1 to 4 carbon atoms, inclusive, are methyl, ethyl, propyl, and butyl, and isomeric forms thereof. Examples of alkyl of 1 to 6 carbon atoms, inclusive, are methyl, ethyl, propyl, butyl, pentyl, and hexyl, and isomeric forms thereof. Examples of alkenyl of 3 to 6 carbon atoms, inclusive, are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl - 2 - butenyl, 1,3 - dimethyl - 2 - butenyl, 1 - ethyl-2-butenyl, 4-methyl-2-pentenyl, 5-hexenyl, and the like. Examples of alkyl of 1 to 8 carbon atoms, inclusive, are methyl, ethyl, propyl, butyl, pentyl, hexyl, heptyl, and octyl, and isomeric forms thereof. Examples of heterocyclic moieties within the scope of $R_6$, in addition to those already mentioned above, are 2-methylaziridinyl,
2-ethylaziridinyl,
2-n-butylaziridinyl,
2,3-dimethylaziridinyl,
2,2-dimethylaziridinyl,
2-methylazetidinyl,
3-methylazetidinyl,
2-n-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-n-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-di-n-octylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-di-n-pentylpiperidino,
2,4,6-trimethylpiperidino,
2,6-dimethyl-4-n-octylpiperidino,
2,3,5-triethylpiperidino,
2-ethylhexahydroazepinyl,
4-tert-butylhexahydroazepinyl,
3-n-heptylhexahydroazepinyl,
2,4-dimethylhexahydroazepinyl,
3,3-dimethylhexahydroazepinyl,
2,4,6-tri-n-propylhexahydroazepinyl,
2-methylheptamethyleneimino,
5-n-butylheptamethyleneimino,
2,4-diisopropylheptamethyleneimino,
3,3-diethylheptamethyleneimino,
2,5,8-trimethylheptamethyleneimino,
3-methyloctamethyleneimino,
2,9-diethyloctamethyleneimino,
4-isooctyloctamethyleneimino,
2-ethylmorpholino,
2-methyl-5-ethylmorpholino,
3,3-dimethylmorpholino,
2,6-di-tert-butylmorpholino,
3-methylthiomorpholino,
2,2-diethylthiomorpholino,
2,6-di-n-hexylthiomorpholino, and the like.

In each of the above examples of heterocyclic moieties, the free valence, and hence the point of attachment to a carbon atom of $C_nH_{2n}$ in Formula II, is on the heterocyclic nitrogen atom. Examples of —$C_nH_{2n}$— bridges are —$CH_2CH_2$—, —$CH_2CH_2CH_2$—, —$CH_2CH(CH_3)$—
—$CH_2CH_2CH_2CH_2$—, —$CH_2CH_2CH(CH_3)$—
—$CH_2CH(CH_3)CH_2$—, —$CH_2CH(CH_2CH_3)$—
—$CH(CH_3)CH(CH_3)$—, —$CH_2CH_2CH_2CH_2CH_2$—
—$CH_2CH_2CH_2CH(CH_3)$—, —$CH_2CH_2CH(CH_3)CH_2$—
—$CH_2CH(CH_3)CH(CH_3)$—
—$CH(CH_3)CH_2CH(CH_3)$—
—$CH_2CH_2CH(CH_2CH_3)$—, —$CH_2CH(CH_2CH_3)CH_2$—
—$CH(CH_3)CH(CH_2CH_3)$—
—$CH_2CH(CH_2CH_2CH_3)$—
—$CH_2CH_2CH_2CH_2CH_2CH_2$—
—$CH_2CH_2CH_2CH_2CH(CH_3)$—
—$CH_2CH_2CH_2CH(CH_3)CH_2$—
—$CH_2CH_2CH(CH_3)CH_2CH_2$—
—$CH_2CH_2CH(CH_3)CH(CH_3)$—
—$CH_2CH(CH_3)CH(CH_3)CH_2$—
—$CH(CH_3)CH_2CH_2CH(CH_3)$—
—$CH(CH_2CH_3)CH(CH_2CH_3)$—
—$CH_2CH(CH_2CH_2CH_3)CH_2$— and the like. The point of attachment of the nitrogen atom of the azepin-2-one moiety in compounds of Formulas I and II can be at either end of the above examples of —$C_nH_{2n}$—.

The novel N-substituted 1,3-dihydro-2H-azepin-2-ones of Formulas I and II exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases.

The novel compounds of Formulas I and II also form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The novel N-substituted 1,3-dihydro-2H-azepin-2-ones of Formulas I and II, either in the free base form, as acid addition salts wherein the acid is pharmacologically acceptable, for example, hydrochloric acid or citric acid, and as lower alkyl quaternary ammonium salts, i.e., alkyl with 1 to 8 carbon atoms, inclusive, are useful in the treatment of topical fungal infections in mammals and other animals caused by such fungi as *Microsporum canis* and *Trichophyton rubrum*, or for eradicating such fungi from inanimate objects. Also they are useful in the treatment of plant infections caused by such fungi as *Alternaria solani* and *Fusarium oxysporum* var. *cubense*.

The higher alkyl quaternary ammonium salts of the novel N-substituted 1,3-dihydro-2H-azepin-2-ones of Formulas I and II, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formulas I and II are useful as intermediates in the preparation of said alkyl quaternary ammonium salts.

The thiocyanic acid addition salts of the N-substituted 1,3-dihydro-2H-azepin-2-ones of Formulas I and II, when condensed with formaldehyde, form resinous materials useful as pickling inhibitors according to U.S. Patents 2,425,320 and 2,605,155. The N-substituted 1,3-dihydro-2H-azepin-2-ones of Formulas I and II also form fluosilicic acid addition salts and alkyl quaternary ammonium fluosilicates which are useful as mothproofing agents according to U.S. Patents 1,915,334 and 2,075,359.

The N-substituted 1,3-dihydro-2H-azepin-2-ones of Formulas I and II also form salts with penicillins. These salts have solubility characteristics which cause them to be useful in the isolation and purification of penicillins, particularly benzyl penicillin. Said salts can be formed either by neutralization of the free base form of a compound of Formula I or Formula II with the free acid form of a penicillin, or by a metathetical exchange of the anion of an acid addition salt of a compound of Formula I or Formula II, for example, the chloride ion of a hydrochloride, with the anionic form of a penicillin.

The N-substituted 1,3-dihydro-2H-azepin-2-ones of Formulas I and II are also of value as intermediates in chemical synthesis. For example, reduction of the carbon-carbon double bonds, for example, by hydrogenation in the presence of a noble metal catalyst such as platinum, followed by replacement of the carbonyl oxygen atom by two hydrogen atoms, for example, by reduction with lithium aluminum hydride, produces the corresponding substituted hexahydroazepine. These diamines form diacid addition salts with thiocyanic acid, fluosilicic acid and penicillins which are useful for the same purposes as the monoacid salts of these acids discussed supra, i.e., to prepare pickling inhibitors, as mothproofing agents, and in the isolation and purification of penicillins.

The N-substituted 1,3-dihydro-2H-azepin-2-ones of Formula I are prepared by reacting a compound of the formula:

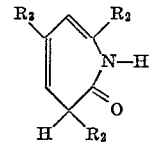

III wherein $R_1$, $R_2$, and $R_3$ as are given above, first with a material selected from the group consisting of alkali metals, alkali metal hydrides, and alkali metal amides, and then with an organic halide of the formula:

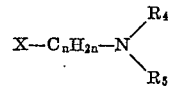

IV wherein X is a member selected from the group consisting of chloride, bromide, and iodide, wherein $R_4$, $R_5$, and $n$ are as given above, and wherein X and N are separated by a chain of at least 2 carbon atoms.

The N-substituted 1,3-dihydro-2H-azepin-2-ones of Formula II are similarly prepared by reacting a compound of Formula III as defined above, first with a material selected from the group consisting of alkali metals, alkali metal hydrides, and alkali metal amides, and then with an organic halide of the formula:

$$X—C_nH_{2n}—R_6 \qquad V$$

wherein X, $n$, and $R_6$ are as given above, wherein X and $R_6$ are separated by a chain of at least 2 carbon atoms, and wherein the nitrogen atom of $R_6$ is attached to a carbon atom of $C_nH_{2n}$.

The starting 1,3-dihydro-2H-azepin-2-one of Formula III is prepared by reacting an ethereal solution of chloramide ($ClNH_2$) with the sodium salt of a phenol of the formula:

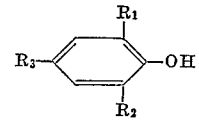

VI wherein $R_1$, $R_2$, and $R_3$ are as given above, in the presence of an additional quantity of the phenol. Reactants such as these have been interacted in a similar manner by Theilacker et al. [Angew. Chem. 72, 131 (1960)] but the reaction products were formulated by them as O-arylhydroxylamines.

Phenols of Formula VI can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem, 69, 699–706 (1957)]. Examples of phenols suitable for this reaction are 2,6-dimethylphenol (2,6-xylenol),
2,4,6-trimethylphenol (mesitol),
2,6-diethylphenol,
2,4,6-triethylphenol, 2,6-di-n-propylphenol,
2,6-diisopropylphenol,
2,4,6-triisopropylphenol,
2,6-diisobutylphenol,
2,4,6-tri-tert-butylphenol,
2-ethyl-6-methylphenol,
2-methyl-6-n-propylphenol,
2-ethyl-6-n-propylphenol,
2-tert-butyl-6-methylphenol,
2-sec-butyl-6-methylphenol,
2-tert-butyl-6-ethylphenol,
2-tert-butyl-6-isopropylphenol,
2-isobutyl-6-n-propylphenol,
4-sec-butyl-2,6-dimethylphenol,
4-tert-butyl-2,6-dimethylphenol,
2,4-dimethyl-6-ethylphenol,
2,4-dimethyl-6-n-propylphenol,
6-tert-butyl-2,4-dimethylphenol,
2,6-diethyl-4-methylphenol,
2,6-diisopropyl-4-methylphenol,
2,4-di-tert-butyl-6-methylphenol,
2,6-di-tert-butyl-4-ethylphenol,
2,4-di-tert-butyl-6-n-propylphenol,
2,6-diisobutyl-4-n-propylphenol,
2,6-di-tert-butyl-4-sec-butylphenol,
2-tert-butyl-4-ethyl-6-methylphenol,
2-sec-butyl-6-isopropyl-4-methylphenol,
2-n-butyl-6-tert-butyl-4-methylphenol,
and the like.

The first step in the preparation of an N-substituted 1,3-dihydro-2H-azepin-2-one of Formula I or Formula II is the reaction of the corresponding 1,3-dihydro-2H-azepin-2-one of Formula III with an alkali metal reactant such as an alkali metal, an alkali metal hydride, or an alkali metal amide. Examples of suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the organic reactant of Formula III. The alkali metal reactant and the Formula III compound are mixed and the reaction between them is carried out at temperatures which can vary from about 0° to about 150° C., preferably from about 25° to about 100° C. The most suitable temperature will of course depend upon such factors as the reactivities of the alkali metal reactant and the compound of Formula III, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the 1,3-dihydro-2H-azepin-2-one of Formula III and the alkali metal reactant, although an excess of either reactant can be used. The time required for completing the reaction will depend on the reaction temperature, the reactivities of the two reactants, and the nature of the solvent. Illustratively, with sodium hydride, the reaction frequently requires about 15 minutes to about 3 hours at temperatures ranging from about 50° to about 100° C.

After the reaction between the alkali metal reactant and the 1,3-dihydro-2H-azepin-2-one of Formula III is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with an organic halide of Formula IV or Formula V. The organic chlorides are preferred for this next step because they are more easily prepared and are relatively inexpensive, although the corresponding organic bromides and iodides can be used and are advantageous in some instances because of their greater reactivity.

Examples of chlorides of Formula IV suitable for this reaction are

N-(2-chloroethyl)dimethylamine,
N-(2-chloroethyl)-N-methylethylamine,
N-(2-chloroethyl)diethylamine,
N-(2-chloroethyl)di-n-propylamine,
N-(2-chloroethyl)diisopropylamine,
N-(2-chloroethyl)-N-methylisopropylamine,
N-(2-chloroethyl)di-n-butylamine,
N-(2-chloroethyl)di-sec-butylamine,
N-(2-chloroethyl)diisobutylamine,
N-(2-chloroethyl)di-tert-butylamine,
N-(2-chloroethyl)-N-methyl-n-butylamine,
N-(2-chloroethyl)-N-ethyl-sec-butylamine,
N-(2-chloroethyl)di-n-pentylamine,
N-(2-chloroethyl)diisopentylamine,
N-(2-chloroethyl)-N-methyl-n-pentylamine,
N-(2-chloroethyl)-N-ethyl-2-methylbutylamine,
N-(2-chloroethyl)di-n-hexylamine,
N-(2-chloroethyl)diisohexylamine,
N-(2-chloroethyl)-N-methyl-n-hexylamine,
N-(2-chloroethyl)-N-ethyl-2,3-dimethylbutylamine,
N-(2-chloroethyl)-diallylamine,
N-(2-chloroethyl)di-2-methylallylamine,
N-(2-chloroethyl)-N-methylallylamine,
N-(2-chloroethyl)di-2-butenylamine,
N-(2-chloroethyl)di-2-ethylallylamine,
N-(2-chloroethyl)di-3-pentenylamine,
N-(2-chloroethyl)-N-methyl-5-hexenylamine,
N-(3-chloropropyl)dimethylamine,
N-(3-chloropropyl)diethylamine,
N-(3-chloropropyl)-N-methylisobutylamine,
N-(3-chloropropyl)diisopentylamine,
N-(3-chloropropyl)diallylamine,
N-(2-chloropropyl)diethylamine,
N-(2-chloropropyl)-N-methylisopropylamine,
N-(4-chlorobutyl)dimethylamine,
N-(4-chlorobutyl)di-tert-butylamine,
N-(4-chlorobutyl)di-2-butenylamine,
N-(3-chlorobutyl)-N-methylethylamine,
N-(3-chlorobutyl)di-1-methylallylamine,
N-(3-chloro-1-methylpropyl)di-n-butylamine,
N-(3-chloro-1-methylpropyl)diallylamine,
N-(2-chloro-1-methylpropyl)diethylamine,
N-(2-chloro-1-methylpropyl)di-3-butenylamine,
N-(5-chloropentyl)dimethylamine,
N-(5-chloropentyl)-N-isopropylallylamine,
N-(3-chloro-1,2-dimethylpropyl)di-n-propylamine,
N-(3-chloro-1,2-dimethylpropyl)-N-methylallylamine,
N-(5-chloro-2-methylpentyl)-diethylamine,
N-(6-chlorohexyl)di-n-hexylamine, N-(4-chloro-1-methylpentyl)-N-methylethylamine,
N-[2-(chloromethyl)pentyl]di-2-butenylamine, and the like. Examples of bromides and iodides of Formula IV suitable for this reaction are the bromides and iodides corresponding to each of the above chlorides of Formula IV.

Examples of chlorides of Formula V suitable for this reaction are

N-(2-chloroethyl)aziridine,
N-(2-chloroethyl)-2-methylaziridine,
N-(3-chloropropyl)-2,3-dimethylaziridine,
N-(4-chlorobutyl)-2,2-dimethylaziridine,
N-(5-chloro-2-methylpentyl)aziridine,
N-(2-chloroethyl)azetidine,
N-(2-chloroethyl)-2-methylazetidine,
N-(3-chloropropyl)-3-methylazetidine,
N-(2-chloropropyl)-2-n-octylazetidine,
N-(5-chloropentyl)-2,2-dimethylazetidine,
N-(5-chloro-2-methylpentyl)-3,3-diethylazetidine,
N-(3-chloro-1,2-dimethylpropyl)-2,4,4-trimethylazetidine,
N-(2-chloroethyl)pyrrolidine,
N-(3-chloropropyl)-2-methylpyrrolidine,
N-(2-chloropropyl)-3-n-butylpyrrolidine,
N-(4-chlorobutyl)-2-isohexylpyrrolidine,
N-(2-chloroethyl)-2,3-dimethylpyrrolidine,
N-(2-chloroethyl)2,2,4-trimethylpyrrolidine,
N-(3-chloro-1-methylpropyl)-2,2-dimethylpyrrolidine,
N-(6-chlorohexyl)-2,5-diethylpyrrolidine,
N-(3-chlorobutyl)-3-tertbutylpyrrolidine,
N-(5-chloro-2-methylpentyl)-3,4-di-n-octylpyrrolidine,
N-(3-chloropropyl)piperidine,
N-(2-chloroethyl)-2-methylpiperidine,
N-(2-chloropropyl)-3-methylpiperidine,
N-(3-chlorobutyl)-4-methylpiperidine,
N-(4-chlorobutyl)-3-isopropylpiperidine,
N-(2-chloro-1-methylethyl)-4-tert-butylpiperidine,
N-(2-chloroethyl)-2,4,6-trimethylpiperidine,
N-(3-chloropropyl)-2-methyl-5-ethylpiperidine,
N-(5-chloropentyl)-3,5-di-n-pentylpiperidine,
N-(6-chlorohexyl)-2,6-dimethyl-4-n-octylpiperidine, octylpiperidine,
N-(2-chloroethyl)hexahydroazepine,
N-(2-chlorobutyl)-2-ethylhexahydroazepine,
N-(3-chloropropyl)-4-tert-butylhexahydroazepine,
N-(3-chloro-1-methylpropyl)-3,3-dimethylhexahydroazepine,
N-(5-chloropentyl)-2,4,6-tri-n-propylhexahydroazepine,
N-(2-chloroethyl)heptamethyleneimine,
N-(3-chloropropyl)-2-methylheptamethyleneimine,
N-(3-chlorobutyl)-2,4-diisopropylheptamethyleneimine,
N-(5-chloro-2-methylpentyl)-3,3-dimethylheptamethyleneimine,
N-(4-chlorobutyl)octamethyleneimine,
N-(2-chloroethyl)-3-methyloctamethyleneimine,
N-(6-chlorohexyl)-4-isoöctyloctamethyleneimine,
N-(3-chloropropyl)morpholine,
N-(3-chloro-1-methylpropyl)-2-ethylmorpholine,
N-(2-chloroethyl)-2-methyl-5-ethylmorpholine,
N-(4-chloro-1-methylpentyl)-3,3-dimethylmorpholine,
N-(2-chloropropyl)thiomorpholine,
N-(5-chlorohexyl)-3-methylthiomorpholine,
N-(2-chloroethyl)-2,2-di-n-pentylthiomorpholine, and the like.

Examples of bromides and iodides of Formula V suitable for this reaction are the bromides and iodides corresponding to each of the above chlorides of Formula V.

These organic halides of Formulas IV and V are either known in the art or can be prepared by methods known in the art [e.g., U.S. Patents 2,483,998; 2,584,131; 2,590,125; and 2,608,574; J. Am. Chem. Soc. 68, 1516–23 (1946); J. Am. Chem. Soc. 68, 1556–9 (1946); J. Am. Chem. Soc. 68, 1579–84 (1946); J. Am. Chem. Soc. 68, 2592–2600 (1946); J. Am. Chem. Soc. 69, 1258–60 (1947); J. Am. Chem. Soc. 70, 3100–2 (1948); J. Am. Chem. Soc. 71, 3988–90 (1949); J. Am. Chem. Soc. 74, 653–6 (1952); J. Am. Chem. Soc. 75, 2072–4 (1953); J. Am. Chem. Soc. 77, 2855–60 (1955); and Helv. Chim. Acta 37, 472–83 (1954)].

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture or described above as being useful in its preparation. It is particularly advantageous to use a solvent for this purpose when the organic halide is a solid at room temperature. Although only one molecular equivalent of the organic halide is required for reaction with one molecular equivalent of the metallo-organic reaction product (preferably calculated on the basis of the amount of 1,3-dihydro-2H-azepin-2-one of Formula III used to prepare the latter), it is preferred to use an excess of the organic halide, for example, about 1.01 to about 5 or even more molecular equivalents of the halide per molecular equivalent of the metallo-organic reaction product. Particularly preferred is the use of about 1.04 to about 1.5 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. The organic iodides are the most reactive and the organic chlorides of the least reactive. Suitable reaction temperatures range from about 0° to about 200° C., preferably from about 10° to about 75° C. Usually, reaction temperatures ranging from about 25° to about 50° C. and reaction times ranging from about 1 to about 20 hours are satisfactory. Before starting the mixing of the metallo-organic reaction mixture and the organic halide, it is desirable to cool the former, for example, externally with ice, to within a range of about 0° to about 25° C., preferably to within a range of about 5° to about 15° C. It is also desirable to carry out the mixing of these two reactants with continued external cooling so that the resulting mixture is constantly at a temperature below about 20° C., preferably about 10° to about 15° C. After the mixing is complete, the temperature of the reaction mixture is caused to rise to a suitable reaction temperature as discussed above. The desired N-substituted 1,3-dihydro-2H-azepin-2-one of Formula I or Formula II can be isolated from the reaction mixture by conventional methods, for example, by removal of reaction solvent by evaporation or distillation. If an alkali halide is present as a solid in the reaction mixture, it may with advantage be removed by filtration before the desired organic reaction product is isolated.

The N-substituted 1,3-dihydro-2H-azepin-2-ones of Formulas I and II are transformed to acid addition salts by neutralization with the corresponding inorganic or organic acid, examples of which are given above. This transformation can be carried out by a variety of procedures known to the art to be generally useful for the preparation of amine acid addition salts. The choice of the most suitable procedure will depend on a variety of factors including convenience of operation, economic considerations, and particularly the solubility characteristics of the amine, the acid, and the acid addition salt. If the acid is soluble in water, the basic compound of Formula I or Formula II can be dissolved in water containing at least an equivalent amount of the acid and thereafter the water can be removed by evaporation. If the acid is soluble in a relatively non-polar solvent, for example, diethyl ether or diisopropyl ether, separate solutions of the acid and the basic compound of Formula I or Formula II in such a solvent can be mixed in equivalent amounts, where-upon the acid addition salt will usually precipitate because of its relatively low solubility in the non-polar solvent. Alternatively, the basic compound of Formula I or Formula II can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

These aspects of the invention can be more fully understood by the following examples.

EXAMPLE 1

*1,3-dihydro-3,5,7-trimethyl-2H-azepin-2-one*

The sodium salt of 2,4,6-trimethylphenol in an excess of this phenol was reacted with chloramide, and an organic reaction product was isolated and purified, all by the method of Theilacker et al., supra. This organic reaction product was found to be 1,3 dihydro-3,5,7-trimethyl-2H-azepin-2-one; M.P. 132° C.

*Analysis.*—Calcd. for $C_9H_{13}NO$: C, 71.49; H, 8.67; N, 9.26. Found: C, 71.68; H, 8.47; N, 9.16. U.V. $(C_2H_5OH)$ 252m$\mu$ ($\epsilon$=6.050). I.R. (principal bands, mineral oil mull) 3200, 1695 cm$^{-1}$.

Following the procedure of Example 1 but substituting for the 2,4,6-trimethylphenol, 2,6-dimethylphenol;
2,6-diethylphenol;
2,6-di-n-propylphenol;
2,6-diisopropylphenol;
2,6-diisobutylphenol;
2,6-di-n-butylphenol;
2,4,6-triethylphenol;
2,6-diethyl-4-methylphenol;
2,6-dimethyl-4-ethylphenol;
4-tert-butyl-2,6-dimethylphenol;
2,6-diisoppropyl-4-methylphenol;
2,6-diisobutyl-4-n-propylphenol;
4-sec-butyl-2,6-dimethylphenol; and
2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-di-n-propyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-di-n-butyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-n-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one, respectively.

*Part A.—1,3-dihydro-1-(2-diethylaminoethyl)-3,5,7-trimethyl-2H-azepin-2-one free base*

A 51.5% sodium hydride suspension in mineral oil (2.33 g.; equivalent to 0.05 mole of sodium hydride) was added to a solution of 1,3-dihydro-3,5,7-trimethyl-2H-azepin-2-one (7.6 g., 0.05 mole) in 50 ml. of dimethylformamide. The mixture was stirred at 50° C. for 1 hour. After cooling to 5–10° C., a solution of N-(2-chloroethyl) diethylamine (7.05 g., 0.052 mole) in 10 ml. of xylene was added. After stirring at about 25° C. for 1.5 hours, 150 ml. of diethyl ether was added and the resulting slurry was filtered. The residue remaining after evaporation of the solvent in the filtrate was distilled to yield 10.8 g. of 1,3-dihydro-1-(2-diethylaminoethyl)-3,5,7-trimethyl-2H-azepin-2-one free base as a very pale yellow liquid; B.P. 123° C. at 0.3 mm.; $n_D^{25}$ 1.5002.

*Part B.—1,3-dihydro-1-(2-diethylaminoethyl)-3,5,7-trimethyl-2H-azepin-2-one hydrochloride*

A solution of hydrogen chloride gas in diethyl ether was added gradually to a diethyl ether solution of the 1,3-dihydro - 1 - (2-diethylaminoethyl)-3,5,7-trimethyl-2H-azepin-2-one free base obtained in Example 2, Part A, above, until a white precipitate ceased forming. The resulting solid was filtered and recrystallized from a mixture of ethanol and diethyl ether to yield 1,3-dihydro-1 - (2-diethylaminoethyl)-3,5,7-trimethyl-2H-azepin-2-one hydrochloride as a white powder; M.P. 159–160° C.

*Analysis.*—Calcd. for $C_{15}H_{27}ClN_2O$: C, 62.80; H, 9.49; N, 9.77. Found: C, 63.05; H, 9.44; N, 9.99.

EXAMPLE 3

*Part A.— 1,3 - dihydro - 1 - (3-dimethylaminopropyl)-3,5,7-trimethyl-2H-azepin-2-one 'ree base*

The procedure of Example 2, Part A, was followed except that in place of N-(2-chloroethyl)diethylamine, there was used N-(3-chloropropyl)dimethylamine (6.1 g.; 0.05 mole). There was obtained 2.50 g. of 1,3-dihydro-1-(3 - dimethylaminopropyl)-3,5,7-trimethyl-2H-azepin-2-one free base as a pale yellow liquid; B.P. 121–127° C. at 0.3 mm.

*Part B.— 1,3 - dihydro - 1 - (3-dimethylaminopropyl)-3,5,7-trimethyl-2H-azepin-2-one hydrochloride*

The procedure of Example 2, Part B, was followed except that in place of 1,3-dihydro-1-(2-diethylaminoethyl)-3,5,7-trimethyl-2H-azepin-2-one free base there was used the 1,3 - dihydro-1-(3-dimethylaminopropyl)-3,5,7-trimethyl-2H-azepin-2-one free base obtained in Example 3, Part A, above. There was obtained 1,3-dihydro-1-(3 - dimethylaminopropyl) - 3,5,7-trimethyl-2H-azepin-2-one hydrochloride as a white powder; M.P. 169–169.5° C.

*Analysis.*—Calcd. for $C_{14}H_{25}ClN_2O$: C, 61.63; H, 9.24; N, 10.27. Found: C, 61.91; H, 9.34; N. 10.20.

Following the procedure of Example 2, Part A, but substituting for the

N-(2-chloroethyl)diethylamine, N-(2-bromomethyl)-dimethylamine;
N-(2-iodoethyl)diisopropylamine;
N-(2-chloroethyl)-N-ethyl-2-methylbutylamine;
N-(2-chloroethyl)-diallylamine;
N-(2-chloroethyl)di-3-pentenylamine;
N-(3-bromopropyl)diethylamine;
N-(3-bromopropyl)-N-methyl-n-pentylamine;
N-(3-chloropropyl)di-2-butylamine;
N-(2-iodopropyl)-N-methylisopropylamine;
N-(2-chloropropyl)di-1-methylallylamine;
N-(3-bromobutyl)-N-methyl-n-butylamine;
N-(5-bromopentyl)-dimethylamine;
N-(6-chlorohexyl)di-n-hexylamine;
N-(3-iodo-1,2-dimethylpropyl)di-2-butenylamine; and
N-(4-chloro-1-methylpentyl)-N-methylethylamine, there are obtained, as free bases, 1,3-dihydro-1-(2-dimethylaminoethyl)-3,5,7-trimethyl-2H-azepin-2-one;
1,3-dihydro-1-(2-diisopropylaminoethyl)-3,5,7-trimethyl-2H-azepin-2-one;
1,3-dihydro-1-[2-(N-ethyl-2-methylbutylamino)-ethyl]-3,5,7-trimethyl-2H-azepin-2-one;
1,3-dihydro-1-(2-diallylaminoethyl)-3,5,7-trimethyl-2H-azepin-2-one;
1,3-dihydro-[2-(di-3-pentenylamino)ethyl] 3,5,7-trimethyl-2H-azepin-2-one;
1,3-dihydro-1-(3-diethylaminopropyl)-3,5,7-trimethyl-2H-azepin-2-one;
1,3-dihydro-1-[3-(N-methyl-n-pentyl-amino)propyl] - 3,5,7-trimethyl-2H-azepin-2-one;
1,3-dihydro-1-[3-di-2-butenylamino)propyl]-3,5,7-trimethyl-2H-azepin-2-one;

1,3-dihydro-1-[1-methyl-2-(N-methylisopropylamino)-
   ethyl]-3,5,7-trimethyl-2H-azepin-2-one;
1,3-dihydro-1-[1-methyl-2-(di-1-methylallylamine)-
   ethyl]-3,5,7-trimethyl-2H-azepin-2-one;
1,3-dihydro-1-[1-methyl-3-(N-methyl-n-butylamino)-
   propyl]-3,5,7-trimethyl-2H-azepin-2-one;
1,3-dihydro-1-(5-dimethylaminopentyl)-3,5,7-
   trimethyl-2H-azepin-2-one;
1,3-dihydro-1-[6-(di-n-hexylamino)hexyl]-3,5,7-
   trimethyl-2H-azepin-2-one;
1,3-dihydro-1-[2-methyl-3-(di-2-butenylamino)butyl]-
   3,5,7-trimethyl-2H-azepin-2-one; and
1,3-dihydro-1-[1-methyl-4-(N-methylethylamino)-
   pentyl]-3,5,7-trimethyl-2H-azepin-2-one, respectively.

Following the procedure of Example 2, Part A, but substituting for the combination of
1,3,-dihydro-3,5,7-trimethyl-2H-azepin-2-one and N-(2-chloroethyl)diethylamine as reactants, 1,3-dihydro-3,7-dimethyl-2H-azepin-2-one plus N-(2-bromoethyl)dimethylamine;
1,3-dihydro-3,7-dimethyl-2H-azepin-2-one plus N-(2-iodoethyl)di-n-propylamine;
1,3-dihydro-3,7-diethyl-2H-azepin-2-one plus N-(2-bromoethyl)di-n-pentylamine;
1,3-dihydro-3,7-diethyl-2H-azepin-2-one plus N-(2-chloroethyl)diallylamine;
1,3-dihydro-3,7-di-n-propyl-2H-azepin-2-one plus N-(3-bromopropyl)diisopropylamine;
1,3-dihydro-3,7-diisopropyl-2H-azepin-2-one plus N-(3-chloropropyl)diallylamine;
1,3-dihydro-3,7-diisobutyl-2H-azepin-2-one plus N-(3-iodo-1-methylpropyl)di-n-butylamine;
1,3-dihydro-3,7-di-n-butyl-2H-azepin-2-one plus N-(2-chloro-1-methylpropyl)di-3-butenylamine;
1,3-dihydro-3,5,7-triethyl-2H-azepin-2-one plus N-(5-bromopentyl)dimethylamine;
1,3-dihydro-3,7-diethyl-5-methyl-2H-azepin-2-one plus N-(6-chlorohexyl)di-n-hexylamine;
1,3-dihydro-3,7-dimethyl-5-ethyl-2H-azepin-2-one plus N-(4-bromo-1-methylpentyl)-N-methylethylamine;
1,3-dihydro-5-tert-butyl-3,7-dimethyl-2H-azepin-2-one plus N-(3-chlorobutyl)di-1-methylallylamine;
1,3-dihydro-3,7-diisopropyl-5-methyl-2H-azepin-2-one plus N-(2-bromoethyl)diethylamine; and
1,3-dihydro-3,5,7-triisopropyl-2H-azepin-2-one plus N-(2-bromoethyl)diisopropylamine, there are obtained, as free bases, 1,3-dihydro-1-(2-dimethylaminoethyl)-3,7-dimethyl-2H-azepin-2-one;
1,3-dihydro-1-[2-(di-n-propylamino)ethyl]-3,7-dimethyl-2H-azepin-2-one;
1,3-dihydro-1-[2-(di-n-pentylamino)ethyl]-3,7-diethyl-2H-azepin-2-one;
1,3-dihydro-1-(2-diallylaminoethyl)-3,7-diethyl-2H-azepin-2-one;
1,3-dihydro-1-(3-diisopropylaminopropyl)-3,7-di-n-propyl-2H-azepin-2-one;
1,3-dihydro-1-(3-diallylaminopropyl)-3,7-diisopropyl-2H-azepin-2-one;
1,3-dihydro-1-[3-(di-n-butylamino)butyl]-3,7-diisobutyl-2H-azepin-2-one;
1,3-dihydro-1-[1-methyl-2-(di-3-butenylamino)propyl]-3,7-di-n-butyl-2H-azepin-2-one;
1,3-dihydro-1-(5-dimethylaminopentyl)-3,5,7-triethyl-2H-azepin-2-one;
1,3-dihydro-1-[6-(di-n-hexylamino)hexyl]-3,7-diethyl-5-methyl-2H-azepin-2-one;
1,3-dihydro-1-[1-methyl-4-(N-methylethylamino)pentyl]-3,7-dimethyl-5-ethyl-2H-azepin-2-one;
1,3-dihydro-1-[1-methyl-3-(di-1-methylallylamino)propyl]-5-tert-butyl-3,7-dimethyl-2H-azepin-2-one;
1,3-dihydro-1-(2-diethylaminoethyl)-3,7-diisopropyl-5-methyl-2H-azepin-2-one and
1,3-dihydro-1-(2-dihydro)-1-(2-diisopropylaminoethyl)-3,5,7-triisopropyl-2H-azepin-2-one, respectively.

Following the procedure of Example 2, Part B, but substituting for the hydrogen chloride, hydrogen bromide; hydrogen iodide; sulfuric acid; phosphoric acid; perchloric acid; thiocyanic acid; acetic acid; benzoic acid; salicyclic acid; glycolic acid; succinic acid; nicotinic acid; tartaric acid; maleic acid; malic acid; lactic acid; methanesulfonic acid; and cyclohexanesulfamic acid, there are obtained the corresponding acid addition salts of 1,3-dihydro-1-(2-diethylaminoethyl)-3,5,7-trimethyl-2H-azepin-2-one. In the same manner, each of the other specific N-substituted 1,3-dihydro-2H-azepin-2-ones of Formula I mentioned above is transformed into acid addition salts with each of the specific inorganic and organic acids mentioned above.

EXAMPLE 4

Part A.—1,3-dihydro-1-[2-(1-pyrrolidinyl)ethyl]-3,5,7-
trimethyl-2H-azepin-2-one free base A 51.5% sodium hydride suspension in mineral oil (4.65 g.; equivalent to 0.10 mole of sodium hydride) was added in several portions to a solution of 1,3-dihydro-3,5,7-trimethyl-2H-azepin-2-one (15.1 g.; 0.10 mole) in 100 ml. of dimethylformamide. The mixture was stirred at 55° C. for 30 minutes. After cooling to 10° C., a solution of N-(2-chloroethyl)pyrrolidine in an equal weight of toluene (32 g. of solution; equivalent to 0.12 mole of halide) was added in a thin stream, the resulting mixture being kept below 20° C. by external cooling. When the addition was complete, the mixture was stirred for an additional 1.5 hours at 25° C. Diethyl ether (about 200 ml.) was then added and the resulting slurry was filtered. The residue remaining after evaporation of the solvent in the filtrate was distilled to yield 18.2 g. of 1,3-dihydro-1-[2-(1-pyrrolidinyl)ethyl]-3,5,7-trimethyl-2H-azepin-2-one free base; B.P. 126–138° C. at 0.13 mm.; $n_D^{26}$ 1.6693.

Part B.—1,3-dihydro-1-[2-(1-pyrrolidinyl)ethyl]-3,5,7-
trimethyl-2H-azepin-2-one hydrochloride A solution of hydrogen chloride gas in diethyl ether was added gradually to a diethyl ether solution of the 1,3-dihydro-1-[2-(1-pyrrolidinyl)ethyl]-3,5,7-trimethyl-2H-azepin-2-one free base obtained in Example 4, Part A, above, until a white precipitate ceased forming. The resulting solid was filtered and recrystallized from a mixture of ethanol and diethyl ether to yield 1,3-dihydro-1-[2-(1-pyrrolidinyl)ethyl]-3,5,7-trimethyl-2H-azepin-2-one hydrochloride; M.P. 197–198° C.

*Analysis.*—Calcd. for $C_{15}H_{25}ClN_2O$: C, 63.25; H, 8.85; N, 9.84. Found: C, 63.43; H, 8.81; N, 9.76.

EXAMPLE 5

1,3-dihydro-1-[2-(2,2,4-trimethyl-1-pyrrolidinyl)ethyl]-
3,5,7-trimethyl-2H-azepin-2-one free base The procedure of Example 4, Part A, was followed except that in place of N-(2-chloroethyl)pyrrolidine, there was used N-(2-chloroethyl)-2,2,4-trimethylpyrrolidine (42.2 g. of a 50% toluene solution; equivalent to 0.12 mole of halide). There was obtained 26.7 g. of 1,3-dihydro-1-[2-(2,2,4-trimethyl-1-pyrrolidinyl)ethyl]-3,5,7-trimethyl-2H-azepin-2-one free base; B.P. 136–147° C. at 0.2 mm.; $n_D^{26}$ 1.5034; B.P. on redistillation 150° C. at 0.5 mm.; $n_D^{25}$ 1.5040.

*Analysis.*—Calcd. for $C_{18}H_{30}N_2O$: C, 74.43; H, 10.41; N, 9.65. Found: C, 74.07; H, 10.37; N, 9.39.

EXAMPLE 6

Part A.—1,3-dihydro-1-[2-(1-pyrrolidinyl)propyl]-
3,5,7-trimethyl-2H-azepin-2-one free base The procedure of Example 4, Part A, was followed except that in place of N-(2-chloroethyl)pyrrolidine, there was used N-(2-chloro-1-methylethyl)pyrrolidine (35.4 g. of a 50% toluene solution; equivalent to 0.12 mole of halide). There was obtained 24.1 g. of 1,3-dihydro-1-[2-(1-pyrrolidinyl)propyl]-3,5,7-trimethyl-2H-azepin-2-one free base; B.P. 129–150° C. at 0.3 mm.; $n_D^{25}$ 1.5233.

*Part B.—1,3-dihydro-1-[2-(1-pyrrolidinyl)propyl]-3,5,7-trimethyl-2H-azepin-2-one hydrochloride*

The procedure of Example 4, Part B, was followed except that in place of 1,3-dihydro-1-[2-(1-pyrrolidinyl)ethyl]-3,5,7-trimethyl-2H-azepin-2-one free base, there was used the 1,3-dihydro-1-[2-(1-pyrrolidinyl)propyl]-3,5,7-trimethyl-2H-azepin-2-one free base obtained in Example 6, Part A, above. There was obtained 1,3-dihydro-1 - [2 - (1 - pyrrolidinyl)propyl] - 3,5,7 - trimethyl - 2H-azepin-2-one hydrochloride; M.P. 247–249° C.

*Analysis.*—Calcd. for $C_{16}H_{27}ClN_2O$: C, 64.30; H, 9.11; N, 9.38. Found: C, 64.13; H, 9.04; N, 9.47.

EXAMPLE 7

*Part A.—1,3-dihydro-1-(2-morpholinoethyl)-3,5,7-trimethyl-2H-azepin-2-one free base*

The procedure of Example 4, Part A, was followed except that in place of N-(2-chloroethyl)pyrrolidine, there was used N-(2-chloroethyl)morpholine (36.0 g. of a 50% toluene solution; equivalent to 0.12 mole of halide). There was obtained 20.6 g. of 1,3-dihydro-1(2-morpholinoethyl)-3,5,7-trimethyl-2H-azepin-2-one free base; B.P. 150–158° C. at 0.15 mm.; $n_D^{25}$ 1.5233.

*Part B.—1,3-dihydro-1-(2-morpholinoethyl)-3,5,7-trimethyl-2H-azepin-2-one hydrochloride*

The procedure of Example 4, Part B, was followed except that in place of 1,3-dihydro-1-[2-(1-pyrrolindinyl)-ethyl]-3,5,7-trimethyl-2H-azepin-2 - one free base, there was used the 1,3-dihydro-1-(2 - morpholinoethyl) - 3,5,7-trimethyl-2H-azepin-2-one free base obtained in Example 7, Part A, above. There was obtained 1,3-dihydro-1-(2-morpholinoethyl)-3,5,7-trimethyl-2H-azepin-2-one hydrochloride; M.P. 222–224° C.

*Analysis.*—Calcd. for $C_{15}H_{25}ClN_2O_2$: C. 59.88; H, 8.38; N, 9.31. Found: C, 59.62; H, 8.26; N, 9.08.

EXAMPLE 8

*Part A.—1,3-dihydro-1-(3-piperidinopropyl)-3,5,7-trimethyl-2H-azepin-2-one free base*

The procedure of Example 4, Part A, was followed except that in place of N-(2-chloroethyl)pyrrolidine, there was used N-(3-chloropropyl)piperidine (38.8 g. of a 50% toluene solution; equivalent to 0.12 mole of halide). There was obtained 17.6 g. of 1,3-dihydro-1-(3-piperidinopropyl)-3,5,7-trimethyl-2H-azepin - 2 - one free base; B.P. 146–157° C. at 0.15 mm.; $n_D^{25}$ 1.5191.

*Part B.—1,3-dihydro-1-(3-piperindinopropyl)-3,5,7-trimethyl-2H-azepin-2-one hydrochloride*

The procedure of Example 4, Part B, was followed except that in place of 1,3-dihydro-1-[2-(1-pyrrolidinyl)ethyl]-3,5,7-trimethyl-2H-azepin-2 - one free base, there was used the 1,3-dihydro-1-(3-piperidinopropyl) - 3,5,7-trimethyl-2H-azepin-2-one free base obtained in Example 8, Part A, above. There was obtained 1,3-dhiydro-1-(3-piperidinopropyl)-3,5,7-trimethyl-2H-azepin-2-one hydrochloride; M.P. 171–173° C.

*Analysis.*—Calcd. for $C_{17}H_{29}ClN_2O_2$: C, 65.26; H, 9.34; N, 8.96. Found: C, 64.89; H, 8.93; N, 8.99.

EXAMPLE 9

*Part A.—1,3-dihydro-1-[2-(1-hexahydroazepin)ethyl]-3,5,7-trimethyl-2H-azepin-2-one free base*

The procedure of Example 4, Part A, was followed except that in place of N-(2-chloroethyl)pyrrolidine, there was used N-(2-chloroethyl)hexahydroazepine (39.8 g. of 50% toluene solution; equivalent to 0.12 mole of halide). There was obtained 23.7 g. of 1,3-dihydro-1-[2-(1-hexahydroazepinyl)ethyl]-3,5,7-trimethyl-2H - azepin-2-one free base; B.P. 136-164° C. at 0.20 m.; $n_D^{25}$ 1.5244.

*Part B.—1,3-dihydro-1-[2-(1-hexahydroazepinyl)ethyl] 3,5,7-trimethyl-2H-azepin-2-one hydrochloride*

The procedure of Example 4, Part B, was followed except that in place of 1,3-dihydro-1-[2(1-pyrrolidinyl)ethyl]-3,5,7-trimethyl-2H-azepin-2 - one free base, there was used the 1,3- dihydro-1-[2-(1-hexahydroazepinyl)ethyl]-3,5,7-trimethyl-2H-azepin-2-one free base obtained in Example 9, Part A, above, and that isopropanol was used in place of ethanol as one of the recrystallization solvents. There was obtained 1,3-dihydro-1-[2-(1-hexahydroazepinyl)ethyl]-3,5,7-trimethyl-2H-azepin - 2 - one hydrochloride; M.P. 172–173° C.

*Analysis.*—Calcd. for $C_{17}H_{29}ClN_2O_2$: C., 65:26; H, 9.34; N 8.96. Found: C, 65.04; H. 9.53; N, 8.68.

Following the procedure of Example 4, Part A, but substituting for the combination of 1,3-dihydro-3,5,7-trimethyl-2H-azepin-2-one and N-(2-chloroethyl)pyrrolidine as reactants, 1,3-dihydro-3,7-dimethyl-2H-azepin - 2 - one plus N - (2-bromoethyl)-aziridine; 1,3-dihydro-3,7-diethyl-2H-azepin-2-one plus N-(3-iodopropyl)azetidine;

1,3-dihydro-3,7-di-n-propyl-2H-azepin-2 - one plus N - (4-chlorobutyl)-2-isohexylpyrrolidine;

1,3-dihydro-3,7-di-isopropyl-2H-azepin-2-one plus N - (5-chloro-2-methylpentyl)-3,4,di-n-octypyrrolidine;

1,3-dihydro-3,7-diisobutyl-2H-azepin - 2 - one plus N - (2-bromoethyl)-2-methylpiperidine;

1,3-dihydro-3,7-di-n-butyl-2H-azepin-2-one plus N - (4-chlorobutyl)-3-isopropyl-piperidine;

1,3-dihydro-3,5,7-triethyl-2H-azepin-2-one plus N-(3-iodopropyl)-2-methyl-5-ethylpiperidine;

1,3-dihydro-3,7-dethyl-5-methyl-2H-azepin-2-one plus N-(3-chloro-1-methylpropyl)-3,3 - dimethylhexahydroazepine;

1,3-dihydro-3,7-dimethyl-5-ethyl-2H-azepin-2-one plus N-(2-bromoethyl)heptamethyleneimine;

1,3-dihydro-5-tert-butyl-3,7-dimethyl-2H - azepin - 2 - one plus N-(3-iodopropyl(octamethyleneimine;

1,3-dihydro-3,7-diisopropyl-5-methyl-2H - azepin - 2 - one plus N-(4-chloro-1-methylpentyl)-3,3 - dimethyl - morpholine; and 1,3-dihydro-5-sec-butyl-3,7-dimethyl-2H-azepin-2-one plus N(2-bromopropyl)thiomorpholine, there are obtained, as free base, 1,3-dihydro-1[2-(1-aziridinyl)ethyl] - 3,7 - dimethyl - 2H-azepin-2-one;

1,3-dihydro-1-[3-(1-azetidinyl)propyl]-3,7 - diethyl - 2H-azepin-2-one;

1,3-dihydro-1-[4-(2-isohexyl-1 - pyrrolidinyl)butyl] - 3,7-di-n-propyl-2H-azepin-2-one;

1,3-dihydro-1-[5-(3,4-di-n-octyl-1-pyrrolidinyl) - 4 - methylpentyl]3,7-diisopropyl-2H-azepin-2-one;

1,3-dihydro-1-[2-(2-methylpiperidino)-ethyl] - 3,7 - diisobutyl-2H-azepin-2-one;

1,3-dihydro-1-[4-(3-isopropylpiperindino)butyl] - 3,7 - di-n-butyl-2H-azepin-2-one;

1,3-dihydro-1-[3 (2-methyl - 5 - ethylpiperidino)propyl]-3,5,7-triethyl-2H-azepin-2-one;

1,3-dihydro-1-[3-(3,3 - dimethyl - 1 - hexahydroazepinyl) butyl]-3,7-diethyl-5-methyl-2H-azepin-2-one;

1,3-dihydro-1-[2 - (1 - heptamethyleneimino)ethyl] - 3,7-dimethyl-5-ethyl-2H-azepin-2-one;

1,3-dihydro-1-[3-(1-octamethyleneimino) - propyl]-5-tert-butyl-3,7-dimethyl-2H-azepin-2-one;

1,3-dihydro-1-[1-methyl-4-(3,3-dimethylmorpholino)pentyl]-3,7-diisopropyl-5-methyl-2H-azepin-2-one; and 1,3-dihydro-1-(1-methyl-2-thiomorpholinoethyl) - 5 - sec-butyl-3,7-dimethyl-2H-azepin-2-one, respectively.

Following the procedure of Example 4, Part B, but substituting for the hydrogen chloride, hydrogen bromide; hydrogen iodide; sulfuric acid; phosphoric acid; perchloric acid; thiocyanic acid; acetic acid; benzoic acid; salicylic acid; glycolic acid; succinic acid; nicotinic acid; tartaric acid; maleic acid; malic acid; lactic acid; methanesulfonic acid; and cyclohexanesulfamic acid, there are obtained the corresponding addition salts of 1,3-dihydro-1-[2-(1- pyrrolidinyl)-ethyl]3,5,7-trimethyl-2H-azepin-2-one. In the same manner, each of the other specific N-substituted 1,3-dihydro-2H-azepin-2-ones of Formula II mentioned above is transformed into acid addition salts with each of the specific inorganic and organic acids mentioned above.

The N-substituted 1,3-dihydro-2H-azepin-2-ones of Formula I or Formula II, for example, any of the specific compounds within the scope of Formula I or Formula II mentioned above, can be transformed into alkyl quaternary ammonium salts, for example, by reaction with an alkyl halide, an alkyl nitrate, an alkali metal alkyl sulfate, a dialkyl sulfate, an alkyl arylsulfonate, or an alkyl alkarylsulfonate. Of these, the alkyl halides, i.e., the alkyl chlorides, alkyl bromides, and alkyl iodides, are preferred. Examples of suitable alkyl bromides are methyl bromide, ethyl bromide, n-propyl bromide, isopropyl bromide, n-butyl bromide, isobutyl bromide, sec-butyl bromide, and isomeric forms of each of the following: pentyl bromide, hexyl bromide, heptyl bromide, octyl bromide, nonyl bromide, decyl bromide, undecyl bromide, dodecyl bromide, tridecyl bromide, tetradecyl bromide, pentadecyl bromide, hexadecyl bromide, heptadecyl bromide, octadecyl bromide, nonadecyl bromide, and eicosyl bromide. Examples of suitable alkyl chlorides and alkyl iodides are those corresponding to the above alkyl bromides. These halides are either known in the art or can be prepared by methods known in the art.

The quaternization reaction is carried out by mixing the compound of Formula I or Formula II with the quaternization agent, for example, the alkyl halide. A reaction solvent, for example, ethanol, n-propanol, heptane, chloroform, benzene, toluene or acetonitrile, can be used and is advantageous if the halide is gaseous or a solid at the desired reaction temperature. Although equimolecular amounts of the halide and the compound of Formula I or Formula II are satisfactory as reactants, it is often advantageous to use an excess of a halide which is normally a gas or a low-boiling liquid. For example, about 1.1 to about 10 moles or more of such an alkyl halide per mole of the compound of Formula I or Formula II can be used. On the other hand, if the halide is of high molecular weight, an octadecyl halide, for example, it is often advantageous to use an excess of the compound of Formula I or Formula II, for example, about 1.1 to about 5 moles per mole of the halide. The time and temperature of the reaction will depend largely on the reactivities of the reactants used, particularly on the nature of the alkyl halide. The reaction of the compound of Formula I or Formula II with an alkyl iodide usually proceeds more rapidly to completion than does the corresponding reaction with an alkyl chloride, the alkyl bromides being intermediate in this respect. At about 25° C. or below, the quaternization reaction usually requires about one or more days. At a higher temperature, for example, about 50° to about 120° C., the reaction is usually complete in about 2 to about 8 hours. Higher reaction temperatures than these are usually not advantageous, although reaction temperatures up to about 225° C. are practical. As will be apparent to anyone skilled in the art, the completeness of the reaction may be determined at any time during the reaction by measuring the amount of halide ion present. Other quaternary salts, for example, the acetate, benzoate, nitrate, hydrocinnamate, salicylate, and sulfate can be prepared by treating the corresponding quaternary halide, for example, the bromide, in solution, for example, in ethanol, with the appropriate silver salt, e.g., silver acetate or silver nitrate. Still other quaternary salts, for example, the fluosilicate and the phosphate, can be prepared by treating the corresponding quaternary halide, for example, the bromide, or the corresponding quaternary hydroxide, with the corresponding acid, i.e., fluosilicic acid or phosphoric acid. At the conclusion of any of the above reactions, the resulting quaternary salt can be isolated by conventional techniques, for example, by distillation of any reaction solvent used and any unreacted volatile reactants, preferably at reduced pressure. Any less volatile excess reactants can be removed by washing with a relatively non-polar solvent, for example, hexane, heptane, or the like. The desired product can then be purified, usually advantageously by recrystallization from a suitable solvent or solvent pair, for example, ethanol, ethyl acetate, ethanol plus diethyl ether, ethanol plus benzene, or the like.

This aspect of the invention can be more fully understood by the following examples.

EXAMPLE 10

*1,3-dihydro-1-[2-(1-pyrrolidinyl)ethyl] - 3,5,7 - trimethyl-2H-azepin-2-one methiodide; or, by alternative nomenclature, 1-[2-(2,3-dihydro-3,5,7 - trimethyl - 2 - oxo-1H-azepin-1-yl)ethyl]-1-methyl-pyrrolidinium iodide*

Methyl iodide (14.2 g.; 0.10 mole) was added to a solution of 1,3-dihydro-1-[-(1-pyrrolidinyl)ethyl] - 3,5,7 - trimethyl-2H-azepin-2-one free base (6.0 g.; 0.024 mole) in 65 ml. of ethanol, and the mixture was refluxed for 4.5 hours. The solvent and excess methyl iodide were then removed by distillation at reduced pressure, and the resulting oil was crystallized from a mixture of ethanol and diethyl ether to yield 6.78 g. of 1,3-dihydro-1-[2-(1-pyrrolidinyl)ethyl]-3,5,7-trimethyl-2H-azepin-2-one methiodide; M.P. 180–182° C.

*Analysis.*—Calcd. for $C_{16}H_{27}IN_2O$: C, 49.23; H, 6.97; N, 7.18. Found: C, 49.45; H, 7.65; N, 6.89.

EXAMPLE 11

*1,3-dihydro-1-[2 - (2,2,4 - trimethyl - 1 - pyrrolidinyl)-ethyl] - 3,5,7 - trimethyl - 2H - azepin - 2 - one methiodide; or, by alternative nomenclature, 1-[2-(2,3-dihydro-3,5,7 - trimethyl - 2 - oxo - 1H - azepin - 1 - yl)ethyl]-1,2,2,4-tetramethylpyrrolidinium iodide*

The procedure of Example 10 was followed except that as reactants there were used a solution of 1,3-dihydro-1-[2-(2,2,4-trimethyl-1-pyrrolidinyl)ethyl] - 3,5,7 - trimethyl-2H-azepin-2-one free base (5.8 g.; 0.02 mole) in 60 ml. of ethanol, and methyl iodide (11.4 g.; 0.08 mole). There was obtained 1.75 g. of 1,3-dihydro-1-[2-(2,2,4-trimethyl-1-pyrrolidinyl)-ethyl]-3,5,7-trimethyl-2H - azepin - 2 - one methiodide; M.P. 197–198° C.

*Analysis.*—Calcd. for $C_{19}H_{33}IN_2O$: C, 52.78; H, 7.70; N, 6.48. Found: C, 52.83; H, 7.93; N. 6.50.

EXAMPLE 12

*1,3 - dihydro - 1 - (2 - morpholinoethyl) - 3,5,7 - trimethyl-2H-azepin-2-one methiodide; or, by alternative nomenclature, 1 - [2 - (2,3 - dihydro - 3,5,7 - trimethyl - 2-oxo - 1H - azepin - 1 - yl)ethyl] - 1 - methylmorpholinium iodide*

The procedure of Example 10 was followed except that as reactants there were used a solution of 1,3-dihydro-1-(2-morpholinoethyl)-3,5,7-trimethyl - 2H - azepin - 2 - one free base (4.3 g.; 0.016 mole) in 55 ml. of ethanol, and methyl iodide (9.2 g.; 0.65 mole). There was obtained 4.95 g. of 1,3-dihydro - 1 - (2 - morpholinoethyl) - 3,5,7-trimethyl-2H-azepin-2-one methiodide; M.P. 218–219° C.

*Analysis.*—Calcd. for $C_{16}H_{27}IN_2O_2$: C, 47.29; H, 6.70; N, 6.90. Found: C, 46.94; H, 6.26; N, 6.95.

EXAMPLE 13

*1,3 - dihydro - 1 - (3 - piperidinopropyl) - 3,5,7 - trimethyl - 2H - azepin - 2 - one n-octadecochloride; or by alternative nomenclature, 1-[3-(2,3-dihydro-3,5,7-trimethyl - 2 - oxo - 1H - azepin - 1 - yl)propyl] 1 - n-octadecylpiperidinium chloride*

A solution of n-ocetadecyl chloride (14.4 g.; 0.05 mole) in 50 ml. of ethanol was added to a solution of 1,3-dihydro - 1 - (3-piperidinopropyl) - 3,5,7 - trimethyl-2H-azepin-2-one free base (16.6 g.; 0.06 mole) in 50 ml. of ethanol. The mixture was refluxed for 16 hours. The solvent was removed at reduced pressure and the residue was recrystallized from a mixture of ethanol and diethyl ether to yield 1- [3 - (2,3 - dihydro - 3,5,7 - trimethyl - 2-oxo - 1H - azepin-1-yl)propyl]-1-n-octadecylpiperidinium chloride.

Following the procedure of Example 10 but substituting for the combination of 1,3 - dihydro - 1 - [2 - (1-pyrrolidinyl)ethyl] - 3,5,7 - trimethyl - 2H - azepin - 2-one free base and methyl iodide as reactants, 1,3 - dihydro - 1 - (2 - diethylaminoethyl) - 3,5,7 - trimethyl-2H-azepin-2-one free base plus methyl iodide;
1,3 - dihydro - 1 - (3 - dimethylaminopropyl) - 3,5,7-trimethyl-2H-azepin-2-one free base plus n-propyl chloride;
1,3 - dihydro - 1 - [2 - (di - n - pentylamino) - ethyl]-3,7-diethyl-2H-azepin-2-one free base plus dimethyl sulfate;
1,3 - dihydro - 1 - (3 - diisopropylaminopropyl) - 3,7 - di-n-propyl-2H-azepin-2-one free base plus isopropyl bromide;
1,3 - dihydro - 1 - [6 - (di - n - hexylamino)hexyl] - 3,7-diethyl-5-methyl-2H-azepin-2-one free base plus n-hexyl chloride;
1,3 - dihydro - 1 - [4 - (2 - isohexyl - 1 - pyrrolidinyl)-butyl]-3,7-di-n-propyl-2H-azepin-2-one free base plus n-butyl bromide;
1,3 - dihydro - 1 -[3 - (2 - methyl - 5 - ethylpiperidino)-propyl]-3,5,7-triethyl-2H-azepin-2-one free base plus ethyl bromide;
1,3 - dihydro - 1 - [3 - (3,3 - dimethyl - 1 - hexahydroazepinyl)butyl] - 3,7 - diethyl - 5 - methyl - 2H-azepin-2-one free base plus dimethyl sulfate; and
1,3 - dihydro - 1 - [4 - (3,3 - dimethylmorpholino) - 1-methylpentyl] - 3,7 - diisopropyl - 5 - methyl - 2H-azepin-2-one free base plus methyl iodide, there are obtained
1,3 - dihydro - 1 - (2 - diethylaminoethyl) - 3,5,7 - trimethyl-2H-azepin-2-one methiodide;
1,3 - dihydro - 1 - (3 - dimethylaminopropyl) - 3,5,7-trimethyl-2H-azepin-2-one n-propochloride;
1,3 - dihydro - 1 - [2 - (di - n - pentylamino)ethyl] - 3,7-diethyl-2H-azepin-2-one metho(methosulfate);
1,3 - dihydro - 1 - (3 - diisopropylaminopropyl) - 3,7-di-n-propyl-2H-azepin-2-one isopropobromide;
1,3 - dihydro - 1 - [6 - (di - n - hexylamino)hexyl] - 3,7-diethyl-5-methyl-2H-azepin-2-one n-hexochloride;
1,3 - dihydro - 1 - [4 - (2 - isohexyl - 1 - pyrrolidinyl)butyl] - 3,7 - di - n - propyl - 2H - azepin - 2 - one n-butobromide;
1,3 - dihydro - 1 - [3 - (2 - methyl - 5 - ethylpiperidino)-propyl]-3,5,7-triethyl-2H-azepin-2-one ethobromide;
1,3 - dihydro - 1 - [3 - (3,3 - dimethyl - 1 - hexahydroazepinyl)butyl] - 3,7 - diethyl - 5 - methyl - 2H-azepin-2-one metho(methosulfate); and
1,3 - dihydro - 1 - [4 - (3,3 - dimethylmorpholino) - 1-methylpentyl] - 3,7 - diisopropyl - 5 - methyl - 2H-azepin-2-one methiodide, respectively.

Following the procedure of Example 13 but substituting for the n-octadecyl chloride, n-decyl bromide; n-dodecyl chloride; and n-hexadecyl bromide, there are obtained 1,3 - dihydro - 1 - (3 - piperidinopropyl) - 3,5,7 - trimethyl-2H-azepin-2-one n-decobromide;
1,3 - dihydro - 1 - (3 - piperidinopropyl) - 3,5,7 - trimethyl-2H-azepin-2-one n-dodecochloride; and
1,3 - dihydro - 1 - (3 - piperidinopropyl) - 3,5,7 - trimethyl-2H-azepin-2-one n-hexadecobromide, respectively.

Following the procedure of Example 13 but substituting for the combination of 1,3-dihydro-1-(3-piperidinopropyl) - 3,5,7 - trimethyl - 2H - azepin-2-one and n-octadecyl chloride as reactants, 1,3 - dihydro - 1 - (2 - diethylaminoethyl) - 3,5,7 - trimethyl-2H-azepin-2-one free base plus n-decyl bromide;
1,3 - dihydro - 1 - (3 - dimethylaminopropyl) - 3,5,7-trimethyl-2H-azepin-2-one free base plus n-decyl bromide;
1,3 - dihydro - 1 - (3 - diisopropylaminopropyl) - 3,7-di-n-propyl-2H-azepin-2-one free base plus n-dodecyl chloride;
1,3 - dihydro - 1 - [4 - (2 - isohexyl - 1 - pyrrolidinyl)-butyl]-3,7-di-n-propyl-2H-azepin-2-one free base plus n-dodecyl chloride;
1,3 - dihydro - 1 - [3 - (2 - methyl - 5 - ethylpiperidino)-propyl] - 3,5,7 - triethyl - 2H - azepin - 2 - one free base plus n-hexadecyl bromide; and
1,3 - dihydro - 1 - [3 - (3,3 - dimethyl - 1 - hexahydroazepinyl)butyl] - 3,7 - diethyl - 5 - methyl - 2H-azepin-2-one free base plus n-hexadecyl bromide, there are obtained
1,3 - dihydro - 1 - (2 - diethylaminoethyl) - 3,5,7 - trimethyl-2H-azepin-2-one n-decobromide;
1,3 - dihydro - 1 - (3 - dimethylaminopropyl) - 3,5,7-trimethyl-2H-azepin-2-one n-decobromide;
1,3 - dihydro - 1 - (3 - diisopropylaminopropyl) - 3,7-di-n-propyl-2H-azepin-2-one n-dodecochloride;
1,3 - dihydro - 1 -[4 -(2 - isohexyl - 1 - pyrrolidinyl)-butyl]-3,7-di-n-propyl-2H-azepin-2-one n-dodecochloride;
1,3 - dihydro - 1 - [3 - (2 - methyl - 5 - ethylpiperidino)-propyl]-3,5,7-triethyl-2H-azepin - 2 - one n-hexadecobromide; and
1,3 - dihydro - 1 - [3 - (3,3 - dimethyl - 1 - hexahydroazepinyl)butyl] - 3,7 - diethyl - 5 - methyl - 2H - azepin-2-one n-hexadecobromide, respectively.

The N-substituted 1,3-dihydro-2H-azepin-2-ones of Formulas I and II are also prepared by a reaction sequence which can be formulated as follows:

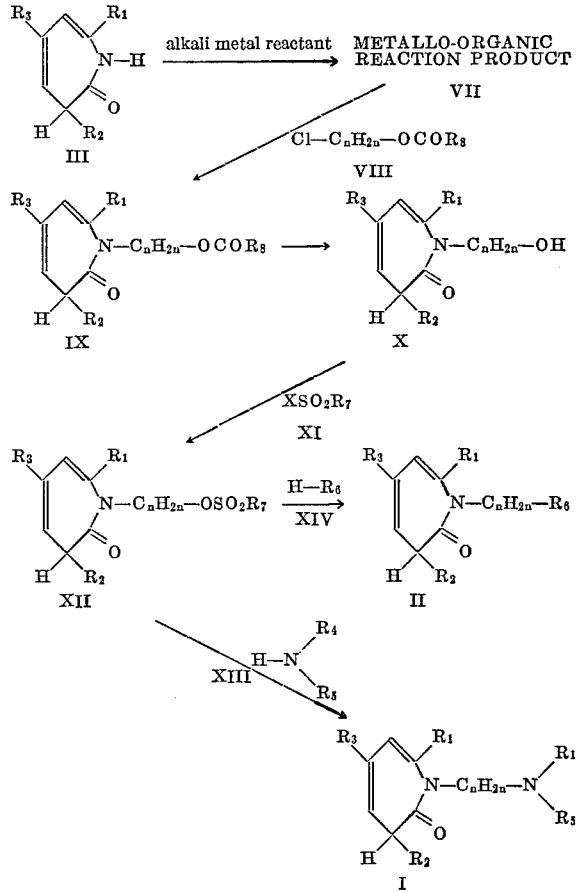

In this reaction sequence, $R_1$, $R_2$, and $R_3$ are as defined above. The compound of Formula III is prepared from a phenol of Formula VI by the method described above and is transformed to the metallo-organic reaction product VII also as described above by reaction with an alkali metal, an alkali metal hydride, or an alkali metal amide. In Formula VIII, $R_8$ is lower alkyl, $n$ is 2 to 6, inclusive, and the chlorine atom and —$OCOR_8$ are separated by a chain of at least two carbon atoms. Examples of lower alkyl are methyl, ethyl, propyl, butyl, pentyl, hexyl, heptyl, octyl, and isomeric forms thereof. Examples of suitable —$C_nH_{2n}$— bridges in compounds of Formula VIII are those given above in the description of compounds of Formulas I and II. These compounds of Formula VIII are either known in the art or can be prepared by methods known in the art, for example, by monoesterification of a glycol of formula HO—$C_nH_{2n}$—OH, where —$C_nH_{2n}$— has the meaning above assigned, with a carboxylic acid of formula $R_8$—COOH, where $R_8$ has the meaning above assigned, followed by chlorination of the remaining hydroxyl group in the intermediate ester, HO—$C_nH_{2n}$—$OCOR_8$, for example, with phosphorus trichloride, phosphorus pentachloride, thionyl chloride, or the like. Alternatively, a compound of formula HO—$C_nH_{2n}$—X where X is chloride, bromide, or iodide, and —$C_nH_{2n}$— has the meaning above assigned, can be transformed to the same intermediate ester, HO—$C_nH_{2n}$—$OCOR_8$, by reaction with a metallic salt of the corresponding carboxylic acid, $R_8COOH$, for example, the alkali metal salt, the resulting ester then being transformed by chlorination to the compound of Formula VIII.

Examples of compounds of Formula VIII suitable for this reaction sequence are
2-chloroethyl propionate,
2-chloroethyl butyrate,
2-chloroethyl isobutyrate,
2-chloroethyl valerate,
2-chloroethyl 2-methylbutyrate,
2-chloroethyl 3-methylbutyrate,
2-chloroethyl 2,2-dimethylpropionate,
2-chloroethyl hexanoate,
2-chloroethyl 2-methylvalerate,
2-chloroethyl 3-methylvalerate,
2-chloroethyl 4-methylvalerate,
2-chloroethyl 2,2-dimethylbutyrate,
2-chloroethyl 2,3-dimethylbutyrate,
2-chloroethyl 2-ethylbutyrate,
2-chloroethyl heptanoate,
2-chloroethyl 2-methylhexanoate,
2-chloroethyl 3-methylhexanoate,
2-chloroethyl 2-ethylvalerate,
2-chloroethyl octanoate,
2-chloroethyl 4-methylheptanoate,
3-chloropropyl acetate,
3-chloropropyl heptanoate,
4-chlorobutyl propionate,
4-chlorobutyl butyrate,
2-chloropropyl 2-methylpropionate,
3-chlorobutyl acetate,
3-chlorobutyl valerate,
3-chloro-1-methylpropyl octanoate,
2-chloro-1-methylpropyl 2-methylhexanoate,
5-chloropentyl 3-methylvalerate,
3-chloro-1,2-dimethylpropyl acetate,
5-chloro-2-methylpentyl 4-methylheptanoate,
6-chlorohexyl acetate,
4-chloro-1-methylpentyl propionate, and the like.

Compounds of Formula VIII in which $R_8$ is methyl, i.e., the acetate esters, are preferred for this reaction sequence because they are relatively inexpensive to prepare and of particularly suitable reactivity in the deesterification stage of the reaction sequence, i.e., transformation of compound IX to compound X.

The reaction of the compound of Formula VIII with the metallo-organic reaction product VII is carried out as described generally above for the reaction of the same metallo-organic reaction product with organic halides of Formulas IV or V.

EXAMPLE 14

*1,3-dihydro-1-(2-acetoxyethyl)-3,5,7-trimethyl-2H-azepin-2-one*

A 51.5% sodium hydride suspension in mineral oil (9.4 g.; equivalent to 0.20 mole of sodium hydride) was added to a solution of 1,3-dihydro-3,5,7-trimethyl-2H-azepin-2-one (30.2 g.; 0.20 mole) in 150 ml. of dimethylformamide. The mixture was stirred at 60° C. for 30 minutes. After cooling to −5° C., 2-chloroethyl acetate (30.6 g.; 0.25 mole) was added dropwise with stirring below 0° C. Thereupon, the reaction mixture was allowed to stand at about 25° C. for about 16 hours. After addition of 200 ml. of diethyl ether, the resulting slurry was filtered. The residue remaining after reduced pressure evaporation of the solvent in the filtrate was distilled under reduced pressure. After a forerun of 11.2 g. of 1,3-dihydro-3,5,7-trimethyl-2H-azepin-2-one, 18.1 g. of 1,3-dihydro-1-(2-acetoxyethyl)-3,5,7-trimethyl-2H-azepin-2-one was obtained; B.P. 124–129° C. at 0.30 mm.; B.P. on redistillation 133–134° C. at 0.40 mm.; $n_D^{26}$ 1.4998.

*Analysis.*—Calcd. for $C_{13}H_{19}NO_3$: C, 65.80; H, 8.07; N, 5.90. Found: C, 65.89; H, 8.03; N, 5.99. U.V. ($C_2H_5OH$) 251 m$\mu$ ($\epsilon$=4,900). I.R. (principal bands) 1745, 1675 cm.$^{-1}$.

Following the procedure of Example 14 but substituting for the 2-chloroethyl acetate, 2-chloroethyl propionate;
2-chloroethyl butyrate;
2-chloroethyl 2-methylpropionate;
3-chloropropyl acetate;
4-chlorobutyl butyrate;
3-chlorobutyl valerate;
6-chlorohexyl acetate;
5-chloro-2-methylpentyl 4-methylheptanoate; and
4-chloro-1-methylpentyl propionate, there are obtained 1,3-dihydro-1-(2-propionoxyethyl)-3,5,7-trimethyl-2H-azepin-2-one;
1,3-dihydro-1-(2-butyroxyethyl)-3,5,7-trimethyl-2H-azepin-2-one;
1,3-dihydro-1-[2-(2-methylpropionoxy)ethyl]-3,5,7-trimethyl-2H-azepin-2-one;
1,3-dihydro-1-(3-acetoxypropyl)-3,5,7-trimethyl-2H-azepin-2-one;
1,3-dihydro-1-(4-butyroxybutyl)-3,5,7-trimethyl-2H-azepin-2-one;
1,3-dihydro-1-(1-methyl-3-valeroxypropyl)-3,5,7-trimethyl-2H-azepin-2-one;
1,3-dihydro-1-(6-acetoxyhexyl)-3,5,7-trimethyl-2H-azepin-2-one;
1,3-dihydro-1-[4-methyl-5-(4-methylheptanoyloxy)-pentyl]-3,5,7-trimethyl-2H-azepin-2-one; and
1,3-dihydro-1-(1-methyl-4-propionoxypentyl)-3,5,7-trimethyl-2H-azepin-2-one, respectively.

Following the procedure of Example 14 but substituting for the combination of 1,3-dihydro-3,5,7-trimethyl-2H-azepin-2-one and 2-chloroethyl acetate as reactants, 1,3-dihydro-3,7-dimethyl-2H-azepin-2-one plus
  2-chloroethyl acetate;
1,3-dihydro-3,7-diethyl-2H-azepin-2-one plus
  2-chloroethyl propionate;
1,3-dihydro-3,7-di-n-propyl-2H-azepin-2-one plus
  2-chloroethyl heptanoate;
1,3-dihydro-3,7-diisopropyl-2H-azepin-2-one plus
  3-chloropropyl acetate;
1,3-dihydro-3,7-diisobutyl-2H-azepin-2-one plus
  3-chloropropyl butyrate;

1,3-dihydro-3,7-di-n-butyl-2H-azepin-2-one plus
  4-chlorobutyl propionate;
1,3-dihydro-3,5,7-triethyl-2H-azepin-2-one plus
  3-chlorobutyl acetate;
1,3-dihydro-3,7-diethyl-5-methyl-2H-azepin-2-one plus
  3-chloro-1-methylpropyl octanoate;
1,3-dihydro-3,7-dimethyl-5-ethyl-2H-azepin-2-one plus
  3-chloro-1,2-dimethylpropyl acetate; and
1,3-dihydro-5-sec-butyl-3,7-dimethyl-2H-azepin-2-one
  plus 6-chlorohexyl acetate, there are obtained 1,3-dihydro-1-(2-acetoxyethyl)-3,7-dimethyl-2H-
  azepin-2-one;
1,3-dihydro-1-(2-propionoxyethyl)-3,7-diethyl-2H-
  azepin-2-one;
1,3-dihydro-1-(2-heptanoyloxyethyl)-3,7-di-n-propyl-
  2H-azepin-2-one;
1,3-dihydro-1-(3-acetoxypropyl)-3,7-diisopropyl-2H-
  azepin-2-one;
1,3-dihydro-1-(3-butyroxypropyl)-3,7-diisobutyl-2H-
  azepin-2-one;
1,3-dihydro-1-(4-propionoxybutyl)-3,7-di-n-butyl-2H-
  azepin-2-one;
1,3-dihydro-1-(1-methyl-3-acetoxypropyl)-3,5,7-
  triethyl-2H-azepin-2-one;
1,3-dihydro-1-(3-octanoyloxybutyl)-3,7-diethyl-5-
  methyl-2H-azepin-2-one;
1,3-dihydro-1-(2-methyl-3-acetoxybutyl)-3,7-dimethyl-
  5-ethyl-2H-azepin-2-one; and
1,3-dihydro-1-(6-acetoxyhexyl)-5-sec-butyl-3,7-
  dimethyl-2H-azepin-2-one, respectively.

The next step in the above reaction sequence, i.e., transformation of compound IX to compound X, is a cleavage of a heterocyclic ester (IX) into the corresponding heterocyclic alcohol (X) plus another compound. Any prior art means generally used for this general type of chemical transformation can be used provided that the lactam linkage and the carbon-carbon double bonds in compound IX survive the reaction unchanged. Such means will be referred to hereinafter as deesterification agents. Saponification is the preferred method for effecting this deesterification. Preferred saponification agents are the alkali metal hydroxides and alkali metal alkoxides. It is also preferred to carry out the saponification in the presence of an organic solvent or a mixture of water plus an organic solvent which will produce a homogeneous reaction mixture. Particularly preferred in this regard are mixtures of water and a lower alkanol, e.g., methanol, ethanol, isopropanol, n-propanol, and the like. The proportions of water and alkanol are not critical and, as will be apparent to those skilled in the art, are adjusted according to the solubilities of the reactants and the products so that a homogenous reaction mixture is formed. It is preferred to use an excess of saponification agent, for example, about 1.01 to about 2 or even more equivalents of saponification agent per molecular equivalent of compound of Formula IX. The saponification reaction usually requires about 1 to about 12 hours at reflux temperature, e.g., a temperature of about 50° to about 150° C., or about 1 to about 3 days at about 25° C. The compound of Formula X can be isolated from the reaction mixture by conventional techniques, for example, by removal of reaction solvent by distillation, followed successively by partition of the reaction products between water and an immiscible organic solvent, and distillation or recrystallization of the desired product.

EXAMPLE 15

*1,3-dihydro-1-(2-hydroxyethyl)-3,5,7-trimethyl-2H-azepin-2-one*

A solution of sodium hydroxide (2.4 g.; 0.06 mole) in 15 ml. of water was added to a solution of 1,3-dihydro-1-(2-acetoxyethyl)-3,5,7-trimethyl-2H-azepin-2-one (11.9 g.; 0.05 mole) in 75 ml. of ethanol. The mixture was stirred for about 18 hours, being refluxed for the first 2 hours and being maintained at about 25° C. thereafter. The residue remaining after removal of the solvent at reduced pressure was then shaken with a mixture of methylene chloride (90 ml.) and water (10 ml.). The methylene chloride layer was separated, dried, filtered, and evaporated. The resulting residue was distilled to give 8.8 g. of 1,3-dihydro-1-(2-hydroxyethyl)-3,5,7-trimethyl-2H-azepin-2-one; B.P. 132–134° C. at 0.30 to 0.35 mm.; B.P. on redistillation 134° C. at 0.35 mm.; $n_D^{25}$ 1.5265.

*Analysis.*—Calcd. for $C_{11}H_{17}NO_2$: C, 67.66; H, 8.78; N, 7.17. Found: C, 67.33; H, 8.89; N, 6.94. I.R. (principal bands) 3420, 1655 cm.$^{-1}$.

Following the procedure of Example 15, but substituting for the 1,3-dihydro-1-(2-acetoxyethyl)-3,5,7-trimethyl-2H-azepin-2-one, 1,3-dihydro-1-(2-propionoxyethyl)-3,5,7-trimethyl-
  2H-azepin-2-one;
1,3-dihydro-1-(3-acetoxypropyl)-3,5,7-trimethyl-
  2H-azepin-2-one;
1,3-dihydro-1-(3-valeroxybutyl)-3,5,7-trimethyl-
  2H-azepin-2-one;
1,3-dihydro-1-(6-acetoxyhexyl)-3,5,7-trimethyl-
  2H-azepin-2-one;
1,3-dihydro-1-(2-heptanoyloxyethyl)-3,7-di-n-propyl-
  2H-azepin-2-one;
1,3-dihydro-1-(1-methyl-3-acetoxybutyl)-3,5,7-triethyl-
  2H-azepin-2-one;
1,3-dihydro-1-(3-octanoyloxybutyl)-3,7-diethyl-5-
  methyl-2H-azepin-2-one; and
1,3-dihydro-1-(2-methyl-3-acetoxybutyl)-3,7-dimethyl-
  5-ethyl-2H-azepin-2-one, there are obtained 1,3-dihydro-1-(2-hydroxyethyl)-3,5,7-trimethyl-
  2H-azepin-2-one;
1,3-dihydro-1-(3-hydroxypropyl)-3,5,7-trimethyl-
  2H-azepin-2-one;
1,3-dihydro-1-(3-hydroxybutyl)-3,5,7-trimethyl-2H-
  azepin-2-one;
1,3-dihydro-1-(6-hydroxyhexyl)-3,5,7-trimethyl-2H-
  azepin-2-one;
1,3-dihydro-1-(2-hydroxyethyl)-3,7-di-n-propyl-2H-
  azepin-2-one;
1,3-dihydro-1-(1-methyl-3-hydroxybutyl)-3,5,7-triethyl-
  2H-azepin-2-one;
1,3-dihydro-1-(3-hydroxybutyl)-3,7-diethyl-5-methyl-
  2H-azepin-2-one; and
1,3-dihydro-1-(2-methyl-3-hydroxybutyl)-3,7-dimethyl-
  5-ethyl-2H-azepin-2-one, respectively.

The next step of the above reaction sequence, i.e., transformation of compound X to compound XII, is the reaction of a sulfonyl halide (XI) with a heterocyclic alcohol (X) whereby an organic sulfonic acid ester (XII) is produced. In Formula XI, X can be fluoride, chloride, bromide, or iodide, and $R_7$ can be lower alkyl, aryl of 6 to 12 carbon atoms, inclusive, aralkyl of 7 to 11 carbon atoms, inclusive, haloaryl of 6 to 10 carbon atoms, inclusive, or nitroaryl of 6 to 10 carbon atoms, inclusive.

Examples of lower alkyl are methyl, ethyl, propyl, butyl, pentyl, hexyl, heptyl, octyl, and isomeric forms thereof. Examples of aryl of 6 to 12 carbon atoms, inclusive, are phenyl, 1-naphthyl, 2-naphthyl, isomeric forms of anthracenyl (i.e., 1-anthracenyl, 2-anthracenyl, and the like), isomeric forms of phenanthryl (i.e., 1-phenanthryl, 2-phenanthryl, and the like), o-tolyl, m-tolyl, p-tolyl, o-ethylphenyl, m-ethylphenyl, p-ethylphenyl, the isomeric forms of propylphenyl and butylphenyl, the isomeric forms of methylnaphthyl and ethylnaphthyl, and the like. Examples of aralkyl of 7 to 11 carbon atoms, inclusive, are benzyl, o-methylbenzyl, m-methylbenzyl, p-methylbenzyl, 1-phenylethyl, 2-phenylethyl, 1-phenylpropyl, 2-phenylpropyl, 3-phenylpropyl, the isomeric forms of phenylbutyl and phenylpentyl, 1-naphthylmethyl, 2-naphthylmethyl, and the like. Examples of haloaryl of 6 to 10 carbon atoms, inclusive, are o-chlorophenyl, m-chlorophenyl, p-chlorophenyl, the isomeric forms of chloromethylphenyl, the isomeric forms of chloronaphthyl, and the like, as well as the fluoroaryl, bromoaryl, and iodoaryl groups corresponding to the above chloroaryl groups (e.g., o-fluorophenyl, o-bromophenyl, o-iodophenyl, and the like). Examples of nitroaryl of 6 to 10 carbon atoms, inclusive, are o-nitrophenyl, m-nitrophenyl, p-nitrophenyl, the isomeric forms of nitromethylphenyl, the isomeric forms of nitronaphthyl, and the like. Examples of sulfonyl chloride of Formula XI suitable for this reaction are methanesulfonyl chloride, ethanesulfonyl chloride, 1-propanesulfonyl chloride, 2-propanesulfonyl chloride, 1-butanesulfonyl chloride, 2-butanesulfonyl chloride, 1-pentanesulfonyl chloride, 2-hexanesulfonyl chloride, 1-heptanesulfonyl chloride, 3-octanesulfonyl chloride, benzenesulfonyl chloride, p-toluenesulfonyl chloride, phenylmethanesulfonyl chloride, m-chlorobenzenesulfonyl chloride, 1-naphthalenesulfonyl chloride, m-nitrobenzenesulfonyl chloride, and the like. Examples of suitable sulfonyl fluorides, bromides, and iodides are those corresponding to the above sulfonyl chlorides.

The reaction of the compound of Formula X with the sulfonyl halide of Formula XI is carried out by mixing these two reactants in the presence of an acid acceptor, for example, an alkali metal hydroxide or a tertiary amine. When an alkali metal hydroxide, for example, sodium hydroxide or potassium hydroxide, is used, water is preferred as a reaction solvent. When a tertiary amine, for example, triethylamine or pyridine, is used, the absence of water from the reaction mixture is preferred although not essential. In the latter case, an excess of the tertiary amine may serve as the reaction solvent, although another organic solvent, for example, an ether or a ketone, may be used. The criterion important in the choice of such a solvent is that the solvent does not react competitively with the sulfonyl halide reactant. Although only one mole of the sulfonyl halide of Formula XI is required for reaction with the compound of Formula X, it is preferred to use a slight excess of the sulfonyl halide, for example, about 1.01 to about 1.5 moles of the sulfonyl halide per mole of compound X. The reaction between the sulfonyl halide of Formula XI and the compound of Formula X is preferably carried out at temperatures ranging from about −10° to about 30° C., preferably from about 0° to about 15° C., although temperatures higher than 30° C. can be used. In the preferred low reaction temperature range, the reaction usually requires from about 10 hours to about several days. The product of Formula XII can be isolated by conventional techniques, for example, dilution of the reaction mixture with water and extraction with an immiscible inert solvent, for example, diethyl ether or chloroform, followed by evaporation of the extraction solvent. The compound of Formula XII can be purified by conventional techniques, for example, reduced pressure distillation, recrystallization, or chromatography. However, where the character of the crude reaction product indicates the absence of a substantial amount of impurities, it is preferred to use the compound of Formula XII without further purification in the next step of the reaction sequence which is a reaction with a secondary amine of Formula XIII or Formula XIV, whereby there is formed the compound of Formula I or Formula II, respectively.

For this last step of the reaction sequence, $R_4$, $R_5$, and $R_6$ in Formulas XIII and XIV are as defined above. Examples of suitable secondary amines of Formula XIII are dimethylamine,
N-methylethylamine,
diethylamine,
di-n-propylamine,
diisopropylamine,
N-methylisopropylamine,
di-n-butylamine,
di-sec-butylamine,
diisobutylamine,
di-tert-butylamine,
N-methyl-n-butylamine,
N-ethyl-sec-butylamine,
di-n-pentylamine,
diisopentylamine,
N-methyl-n-pentylamine,
N-ethyl-2-methylbutylamine,
di-n-hexylamine,
diisohexylamine,
N-methyl-n-hexylamine,
N-ethyl-2,3-dimethylbutylamine,
diallylamine,
di-2-methylallylamine,
N-methylallylamine,
di-2-butenylamine,
di-2-ethylallylamine,
di-3-pentylamine,
N-methyl-5-hexenylamine, and the like.

Examples of suitable secondary heterocyclic amines of Formula XIV are aziridine,
2-methylaziridine,
2,3-dimethylaziridine,
2,2-dimethylaziridine,
azetidine,
2-methylazetidine,
3-methylazetidine,
2-n-octylazetidine,
2,2-dimethylazetidine,
3,3-diethylazetidine,
2,4,4-trimethylazetidine,
pyrrolidine,
2-methylpyrrolidine,
3-n-butylpyrrolidine,
2-isohexylpyrrolidine,
2,3-dimethylpyrrolidine,
2,2,4-trimethylpyrrolidine,
2,2-dimethylpyrrolidine,
2,5-diethylpyrrolidine,
3-tert-butylpyrrolidine,
3,4-di-n-octylpyrrolidine,
piperidine,
2-methylpiperidine,
3-methylpiperidine,
4-methylpiperidine,
3-isopropylpiperidine,
4-tert-butylpiperidine,
2,4,6-trimethylpiperidine,
2-methyl-5-ethylpiperidine,
3,5-di-n-pentylpiperidine,
2,6-dimethyl-4-n-octylpiperidine,
hexahydroazepine,
2-ethylhexahydroazepine,
4-tert-butylhexahydroazepine,
3,3-dimethylhexahydroazepine,
2,4,6-tri-n-propylhexahydroazepine,
heptamethyleneimine,
2-methylheptamethyleneimine,
2,4-diisopropylheptamethyleneimine,
3,3-dimethylheptamethyleneimine,
octamethyleneimine,
3-methyloctamethyleneimine,
4-isoöctyloctamethyleneimine,
morpholine,
2-ethylmorpholine,
2-methyl-5-ethylmorpholine, 3,3-dimethylmorpholine,
thiomorpholine,
3-methylthiomorpholine,
2,2-di-n-pentylthiomorpholine, and the like.

The reaction between compound XII and the secondary amine of Formula XIII or Formula XIV is carried out by mixing the two reactants. If one or both of the reactants is normally a liquid, there is no need for the presence of a reaction solvent, although a solvent is usually not harmful and in some cases may be advantageous. If both reactants are normally solids, a reaction solvent is advantageous although not necessary if the two reactants can be transformed to a homogenous melt below the temperature at which either reactant decomposes. When a solvent is desired or necessary, it is preferred to use one which will not react with either of the reactants. Particularly preferred as reaction solvents are the lower alkanols, for example, methanol, ethanol, isopropanol, or the like. Although only one mole of the amine of Formula XIII or Formula XIV is required to form one mole of the compound of Formula I or Formula II, a second mole of said amine is required to neutralize the by-product sulfonic acid, and it is preferred to use an excess of the amine, for example, about 2.1 to about 4 moles of amine per mole of compound XII. When the amine also serves as the reaction solvent, even more amine, for example, up to about 10 moles or more per mole of compound XII can advantageously be used. The reaction is carried out at temperatures ranging from about 10° to about 150° C., preferably from about 20° to about 100° C. The time required for the reaction will depend upon such factors as the temperature, the reactivities of the reactants, and the nature of the solvent, if one is used. At a temperature of about 20° to about 50° C., in the absence of a solvent, the reaction usually requires about 8 hours to about 4 days. The product of Formula I or Formula II can be isolated by conventional techniques, for example, by addition to the reaction mixture of a miscible, relatively non-polar solvent, for example, diethyl ether, which will tend to precipitate the by-product amine-sulfonic acid addition salt, followed by evaporation of the solvents, or, alternatively, by addition of water which will tend to precipitate the desired product of Formula I or Formula II. The crude product of Formula I or Formula II can be purified by conventional techniques, e.g., reduced pressure distillation, and can be converted to the hydrochloride as well as to other inorganic acid and organic acid addition salts as described above.

EXAMPLE 16

*1,3-dihydro-1-(2-morpholinoethyl)-3,5,7-trimethyl-2H-azepin-2-one hydrochloride*

Four successive portions of p-toluenesulfonyl chloride (total: 5.35 g.; 0.028 mole) were added with stirring to a solution of 1,3-dihydro-1-(2-hydroxyethyl)-3,5,7-trimethyl-2H-azepin-2-one (4.9 g.; 0.025 mole) in 35 ml. of pyridine at about 0° C. The resulting mixture was kept at about 5° C. for 48 hours. Ice water (300 ml.) was then added and the mixture was kept at 5° C. for an additional 2 hours, and, thereafter, extracted with several portions of diethyl ether. The ether extracts were combined, extracted with cold 1 N hydrochloric acid, dried, filtered, and evaporated. The residual oily 1,3-dihydro - 1 - (2-p-tolylsulfonyloxyethyl)-3,5,7-trimethyl-2H-azepin-2-one was not purified but was dissolved in morpholine (10 ml.; 0.11 mole). This solution was allowed to stand at 25° C. for 15 hours and was then mixed with about 5 volumes of diethyl ether. The solid which precipitated was filtered and the filtrate was evaporated at reduced pressure to give 1,3-dihydro-1-(2-morpholinoethyl) - 3,5,7 - trimethyl-2H-azepin-2-one free base in the form of an oil. The oily free base was treated with hydrogen chloride by the procedure of Example 4, Part B. There was obtained 1.34 g. of 1,3-dihydro - 1 - (2-morpholinoethyl)-3,5,7-trimethyl-2H-azepin-2-one hydrochloride; M.P. 219–223° C. A mixture of this hydrochloride and the hydrochloride of Example 7, Part B, melted without depression at 219–223° C. The infrared spectra of these two hydrochlorides were identical.

EXAMPLE 17

*1,3-dihydro-1-(2-diethylaminoethyl)-3,5,7-trimethyl-2H-azepin-2-one hydrochloride*

The procedure of Example 16 was followed except that in place of morpholine, there was used diethylamine. There was obtained 1,3-dihydro-1-(2-diethylaminoethyl)-3,5-7-trimethyl-2H-azepin-2-one hydrochloride which had the same melting point and infrared spectrum as the hydrochloride of Example 2, Part B, and which, on admixture with the latter hydrochloride, did not depress its melting point.

Following the procedure of Example 16 but substituting for the morpholine,
di-n-propylamine;
di-n-butylamine;
N-ethyl-secbutylamine;
di-n-hexylamine;
diallylamine;
di-2-butenylamine;
azetidine;
pyrrolidine;
2,2-dimethylpyrrolidine;
piperidine;
2-methyl-5-ethylpiperidine;
hexahydroazepine;
and thiomorpholine, there are obtained first as free bases and then as hydrochlorides,
1,3-dihydro-1-[2-(di-n-propylamino)ethyl]-3,5,7-trimethyl-2H-azepin-2-one;
1,3-dihydro-1-[2-(di-n-butylamino)ethyl]-3,5,7-trimethyl-2H-azepin-2-one;
1,3-dihydro-1-[2-(N-ethyl-sec-butylamino)ethyl]-3,5,7-trimethyl-2H-azepin-2-one;
1,3-dihydro-1-[2-(di-n-hexylamino)ethyl]-3,5,7-trimethyl-2H-azepin-2-one;
1,3-dihydro-1-(2-diallylaminoethyl)-3,5,7-trimethyl-2H-azepin-2-one;
1,3-dihydro-1-[2-(di-2-butenylamine)ethyl]-3,5,7-trimethyl-2H-azepin-2-one;
1,3-dihydro-1-[2-(1-azetidinyl)ethyl]-3,5,7-trimethyl-2H-azepin-2-one;
1,3-dihydro-1-[2-(1-pyrrolidinyl)-ethyl]-3,5,7-trimethyl-2H-azepin-2-one;
1,3-dihydro-1-[2-(2,2-dimethyl-1-pyrrolidinyl)ethyl]-3,5,7-trimethyl-2H-azepin-2-one;
1,3-dihydro-1-(2-piperidinoethyl)-3,5,7-trimethyl-2H-azepin-2-one;
1,3-dihydro-1-[2-(2-methyl-5-ethylpiperidino)ethyl]-3,5,7-trimethyl-2H-azepin-2-one;
1,3-dihydro-1-[2-(1-hexahydroazepinyl)-ethyl]-3,5,7-trimethyl-2H-azepin-2-one; and
1,3-dihydro-1-(2-thiomorpholinoethyl)-3,5,7-trimethyl-2H-azepin-2-one, respectively.

Following the procedure of Example 16 but substituting for the p-toluenesulfonyl chloride,
methanesulfonyl chloride;
ethanesulfonyl bromide;
1-butanesulfonyl iodide;
1-heptanesulfonyl chloride;
benzenesulfonyl fluoride;
m-chlorobenzenesulfonyl chloride;
4-n-butylbenzenesulfonyl chloride;
1-naphthalenesulfonyl chloride;
m-nitrobenzenesulfonyl chloride;
and phenylmethanesulfonyl chloride, there are obtained first, 1,3-dihydro-1-(2-methylsulfonyloxyethyl)-3,5,7-
trimethyl-2H-azepin-2-one;
1,3-dihydro-1-(2-ethylsulfonyloxyethyl)-3,5,7-
trimethyl-2H-azepin-2-one;
1,3-dihydro-1-(2-n-butylsulfonyloxyethyl)-3,5,7-
trimethyl-2H-azepin-2-one;
1,3-dihydro-1-(2-n-heptylsulfonyloxyethyl)-3,5,7-
trimethyl-2H-azepin-2-one;
1,3-dihydro-1-(2-phenylsulfonyloxyethyl)-3,5,7-
trimethyl-2H-azepin-2-one;
1,3-dihydro-1-(2-m-chlorophenylsulfonyloxyethyl)-
3,5,7-trimethyl-2H-azepin-2-one;
1,3-dihydro-1-[2-(4-n-butylphenylsulfonyloxy)ethyl]-
3,5,7-trimethyl-2H-azepin-2-one;
1,3-dihydro-1-[2-(1-naphthylsulfonyloxy)ethyl]-3,5,7-
trimethyl-2H-azepin-2-one;
1,3-dihydro-1-(2-m-nitrophenylsulfonyloxyethyl)-3,5,7-
trimethyl-2H-azepin-2-one;
and 1,3-dihydro-1-(2-benzylsulfonyloxyethyl)-3,5,7-
trimethyl-2H-azepin-2-one, respectively. Each of these compounds within the scope of Formula XII is transformed further by the procedure of Example 16 to the same compound, 1,3-dihydro-1-(2-morpholinoethyl) - 3,5,7 - trimethyl - 2H - azepin-2-one, first as the free base and then as the hydrochloride.

Following the procedure of Example 16 but substituting for the combination of 1,3-dihydro-1-(2-hydroxyethyl)-3,5,7-trimethyl-2H-azepin-2-one, p-toluenesulfonyl chloride, and morpholine as reactants, the combinations of 1,3-dihydro-1-(3-hydroxypropyl)-3,5,7-trimethyl-2H-
azepin-2-one, methanesulfonyl chloride, and piperdine;
1,3-dihydro-1-(3-hydroxypropyl)-3,7-dimethyl-5-n-butyl-
2H-azepin-2-one, m-chlorobenzenesulfonyl chloride,
and pyrrolidine;
1,3-dihydro-1-(6-hydroxyhexyl)-3,5,7-triethyl-2H-
azepin-2-one, benzenesulfonyl bromide,
and diisopropylamine;
1,3-dihydro-1-(4-hydroxybutyl)-3,7-dimethyl-2H-azepin-
2-one, 1-naphthalenesulfonyl chloride,
and di-n-hexylamine;
1,3-dihydro-1-(2-methyl-3-hydroxybutyl)-3,7-diethyl-
2H-azepin-2-one, p-toluenesulfonyl chloride,
and hexahydroazepine;
1,3-dihydro-1-(3-hydroxybutyl)-3,7-diethyl-5-methyl-
2H-azepin-2-one, m-nitrobenzenesulfonyl chloride,
and 2,5-dimethylpyrrolidine;
1,3-dihydro-1-(2-hydroxyethyl)-3,7-dimethyl-5-ethyl-
2H-azepin-2-one, methanesulfonyl chloride,
and diisobutylamine; and
1,3-dihydro-1-(3-hydroxypropyl)3,7-diethyl-2H-azepin-
2-one, ethanesulfonyl chloride, and thiomorpholine, there are obtained as initial products, 1,3-dihydro-1-(3-methylsulfonyloxypropyl)-3,5,7-
trimethyl-2H-azepin-2-one;
1,3-dihydro-1-(3-m-chlorophenylsulfonyloxypropyl)-
3,7-dimethyl-5-n-butyl-2H-azepin-2-one;
1,3-dihydro-1-(6-phenylsulfonyloxyhexyl)-3,5,7-
triethyl-2H-azepin-2-one;
1,3-dihydro-1-[4-(1-naphthylsulfonyloxy)butyl]-3,7-
dimethyl-2H-azepin-2-one;
1,3-dihydro-1-(2-methyl-3-p-tolylsulfonyloxybutyl)-
3,7-diethyl-2H-azepin-2-one;
1,3-dihydro-1-(3-m-nitrophenylsulfonyloxybutyl)-
3,7-diethyl-5-methyl-2H-azepin-2-one;
1,3-dihydro-1-(2-methylsulfonyloxyethyl)-3,7-dimethyl-
5-ethyl-2H-azepin-2-one; and
1,3-dihydro-(3-ethylsulfonyloxypropyl)-3,7-diethyl-2H-
azepin-2-one, respectively.

Then, from each of the above specific sulfonyloxy compounds, there are obtained 1,3-dihydro-1-(3-piperidinopropyl)-3,5,7-trimethyl-
2H-azepin-2-one;

1,3-dihydro-1-[3-(pyrrolidinyl)propyl]-3,7-dimethyl-5-
n-butyl-2H-azepin-2-one;
1,3-dihydro-1-(6-diisopropylaminohexyl)-3,5,7-
triethyl-2H-azepin-2-one;
1,3-dihydro-1-[4-(di-n-hexylamino)butyl]-3,7-dimethyl-
2H-azepin-2-one;
1,3-dihydro-1-[2-methyl-3-(1-hexahydroazepinyl)butyl]-
3,7-diethyl-2H-azepin-2-one;
1,3-dihydro-1-[3-(2,5-dimethyl-1-pyrrolidinyl)butyl]-
3,7-diethyl-5-methyl-2H-azepin-2-one;
1,3-dihydro-1-(2-diisobutylaminoethyl)-3,7-dimethyl-
5-ethyl-2H-azepin-2-one; and
1,3-dyhydro-1-(3-thiomorpholinopropyl) - 3,7 - diethyl-
2H-azepin-2-one, respectively, first as the free bases and then as the hydrochlorides.

I claim:
1. A compound selected from the group consisting of the free base form, acid addition salts, and alkyl quaternary ammonium salts of a compound of the formula:

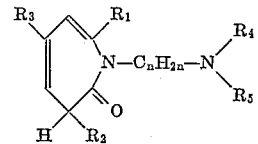

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ and $R_5$ are selected from the group consisting of alkyl of 1 to 6 carbon atoms, inclusive, and alkenyl of 3 to 6 carbon atoms, inclusive, wherein $n$ is 2 to 6, inclusive, wherein the two N atoms are separated by a chain of at least 2 carbon atoms, and wherein the alkyl of said alkyl quaternary ammonium salts contains 1 to 20 carbon atoms, inclusive.

2. 1,3-dihydro-1-(2-diethylaminoethyl)-3,5,7-trimethyl-2H-azepin-2-one free base.

3. 1,3-dihydro-1-(2-diethylaminoethyl)-3,5,7-trimethyl-2H-azepin-2-one hydrochloride.

4. 1,3-dihydro-1-(3-dimethylaminopropyl) - 3,5,7 - trimethyl-2H-azepin-2-one free base.

5. 1,3-dihydro-1-(3-dimethylaminopropyl) - 3,5,7 - trimethyl-2H-azepin-2-one hydrochloride.

6. A compound selected from the group consisting of the free base form, acid addition salts, and alkyl quaternary ammonium salts of a compound of the formula:

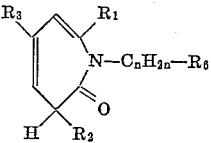

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_6$ is selected from the group consisting of aziridinyl, azetidinyl, pyrrolidinyl, piperidino, hexahydroazepinyl, heptamethyleneimino, octamethyleneimino, morpholino, and thiomorpholino, each having attached as substituents on carbon atoms thereof zero to three alkyl groups, inclusive, each alkyl group being of 1 to 8 carbon atoms, inclusive, wherein $n$ is 2 to 6, inclusive, wherein N and $R_6$ are separated by a chain of at least 2 carbon atoms, wherein the nitrogen atom of $R_6$ is attached to a carbon atom of $C_nH_{2n}$, and wherein the alkyl of said alkyl quaternary ammonium salts contains 1 to 20 carbon atoms, inclusive.

7. 1,3-dihydro-1-[2-(1-pyrrolidinyl)ethyl] - 3,5,7 - trimethyl-2H-azepin-2-one free base.

8. 1,3-dihydro-1-[2-(1-pyrrolidinyl)ethyl] - 3,5,7 - trimethyl-2H-azepin-2-one hydrochloride.

9. 1,3-dihydro-1-[2-(1-pyrrolidinyl)ethyl] - 3,5,7 - trimethyl-2H-azepin-2-one methiodide.

10. 1,3-dihydro-1-[2-(2,2,4-trimethyl-1 - pyrrolidinyl)ethyl]-3,5,7-trimethyl-2H-azepin-2-one free base.

11. 1,3-dihydro-1-[2-(2,2,4-trimethyl-1 - pyrrolidinyl)ethyl]-3,5,7-trimethyl-2H-azepin-2-one methiodide.

12. 1,3-dihydro-1-[2-(1-pyrrolidinyl)propyl]-3,5,7 - trimethyl-2H-azepin-2-one free base.

13. 1,3-dihydro-1-[2-(1-pyrrolidinyl)propyl]-3,5,7 - trimethyl-2H-azepin-2-one hydrochloride.

14. 1,3-dihydro-1-(2-morpholinoethyl)-3,5,7-trimethyl-2H-azepin-2-one free base.

15. 1,3-dihydro-1-(2-morpholinoethyl)-3,5,7-trimethyl-2H-azepin-2-one hydrochloride.

16. 1,3-dihydro-1-(2-morpholinoethyl)-3,5,7-trimethyl-2H-azepin-2-one methiodide.

17. 1,3-dihydro-1-(3-piperidinopropyl)-3,5,7-trimethyl-2H-azepin-2-one free base.

18. 1,3-dihydro-1-(3-piperidinopropyl)-3,5,7-trimethyl-2H-azepin-2-one hydrochloride.

19. 1,3-dihydro-1-[2-(1-hexahydroazepinyl)ethyl] - 3,5,7-trimethyl-2H-azepin-2-one free base.

20. 1,3-dihydro-1-[2-(1-hexahydroazepinyl)ethyl] - 3,5,7-trimethyl-2H-azepin-2-one hydrochloride.

21. A process for the preparation of an N-substituted 1,3-dihydro-2H-azepin-2-one of the formula:

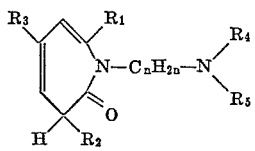

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ and $R_5$ are selected from the group consisting of alkyl of 1 to 6 carbon atoms, inclusive, and alkenyl of 3 to 6 carbon atoms, inclusive, wherein $n$ is 2 to 6, inclusive, and wherein the two N atoms are separated by a chain of at least 2 carbon atoms, which comprises the steps, (1) mixing a compound of the formula:

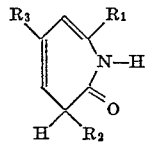

wherein $R_1$, $R_2$, and $R_3$ are as given above, with a material selected from the group consisting of alkali metals, alkali metal hydrides, and alkali metal amides, and (2) mixing the metallo-organic reaction product from step (1) with a compound of the formula:

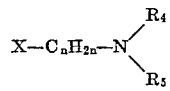

wherein X is a member selected from the group consisting of chloride, bromide, and iodide, wherein $R_4$, $R_5$, and $n$ are as given above, and wherein X and N are separated by a chain of at least 2 carbon atoms, to form said N-substituted 1,3-dihydro-2H-azepin-2-one.

22. A process for the preparation of an N-substituted 1,3-dihydro-2H-azepin-2-one of the formula:

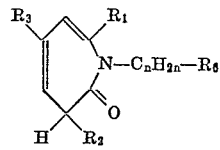

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_6$ is selected from the group consisting of aziridinyl, azetidinyl, pyrrolidinyl, piperidino, hexahydroazepinyl, heptamethyleneimino, octamethyleneimino, morpholino, and thiomorpholino, each having attached as substituents on carbon atoms thereof zero to three alkyl groups, inclusive, each alkyl group being 1 to 8 carbon atoms, inclusive, wherein $n$ is 2 to 6, inclusive, wherein N and $R_6$ are separated by a chain of at least 2 carbon atoms, and wherein the nitrogen atom of $R_6$ is attached to a carbon atom of $C_nH_{2n}$, which comprises the steps, (1) mixing a compound of the formula:

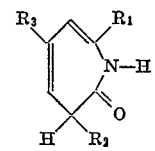

wherein $R_1$, $R_2$, and $R_3$ are as given above, with a material selected from the group consisting of alkali metals, alkali metal hydrides, and alkali metal amides, and (2) mixing the metallo-organic reaction product from step (1) with a compound of the formula:

$$X—C_nH_{2n}—R_6$$

wherein X is a member selected from the group consisting of chloride, bromide, and iodide, wherein $R_6$ and $n$ are as given above, wherein X and $R_6$ are separated by a chain of at least 2 carbon atoms, and wherein the nitrogen atom of $R_6$ is attached to a carbon atom of $C_nH_{2n}$, to form said N-substituted 1,3-dihydro-2H-azepin-2-one.

23. A process for the preparation of an N-substituted 1,3-dihydro-2H-azepin-2-one of the formula:

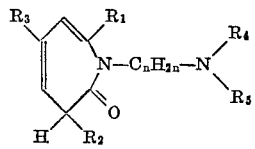

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ and $R_5$ are selected from the group consisting of alkyl of 1 to 6 carbon atoms, inclusive, and alkenyl of 3 to 6 carbon atoms, inclusive, wherein $n$ is 2 to 6, inclusive, and wherein the two N atoms are separated by a chain of at least 2 carbon atoms, which comprises the steps, (1) mixing a compound of the formula:

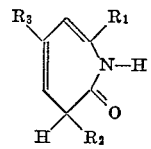

wherein $R_1$, $R_2$, and $R_3$ are as given above, with a material selected from the group consisting of alkali metals, alkali metal hydrides, and alkali metal amides, (2) mixing the metallo-organic reaction product from step (1) with a compound of the formula:

$$Cl—C_nH_{2n}—OCOR_8$$

wherein $R_8$ is lower alkyl, $n$ is as given above, and Cl and $OCOR_8$ are separated by a chain of at least 2 carbon atoms, (3) mixing the heterocyclic ester from step (2) with a deesterification agent, (4) mixing the heterocyclic alcohol from step (3) with a sulfonyl halide of the formula:

$$XSO_2R_7$$

wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein X is halide, and (5) mixing the sulfonic acid ester from step (4) with an amine of the formula:

wherein $R_4$ and $R_5$ are as given above, to form said N-substituted 1,3-dihydro-2H-azepin-2-one.

24. A process for the preparation of an N-substituted 1,3-dihydro-2H-azepin-2-one of the formula:

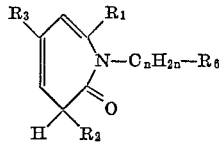

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_6$ is selected from the group consisting of aziridinyl, azetidinyl, pyrrolidinyl, piperidino, hexahydroazepinyl, heptamethyleneimino, octamethyleneimino, morpholino, and thiomorpholino, each having attached as substituents on carbon atoms thereof zero to three alkyl groups, inclusive, each alkyl group being of 1 to 8 carbon atoms, inclusive, wherein $n$ is 2 to 6, inclusive, wherein N and $R_6$ are separated by a chain of at least 2 carbon atoms, and wherein the nitrogen atom of $R_6$ is attached to a carbon atom of $C_nH_{2n}$, which comprises the steps, (1) mixing a compound of the formula:

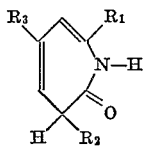

wherein $R_1$, $R_2$, and $R_3$ are as given above, with a material selected from the group consisting of alkali metals, alkali metal hydrides, and alkali metal amides, (2) mixing the metalloorganic reaction product from step (1) with a compound of the formula:

$$Cl-C_nH_{2n}-OCOR_8$$

wherein $R_8$ is lower alkyl, $n$ is as given above, and Cl and $OCOR_8$ are separated by a chain of at least 2 carbon atoms, (3) mixing the heterocyclic ester from step (2) with a deesterification agent, (4) mixing the heterocyclic alcohol from step (3) with a sulfonyl halide of the formula:

$$XSO_2R_7$$

wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein X is halide, and (5) mixing the sulfonic acid ester from step (4) with an amine of the formula:

$$H-R_6$$

wherein $R_6$ is as given above and H is attached to the nitrogen atom of $R_6$, to form said N-substituted 1,3-dihydro-2H-azepin-2-one.

25. A process for the preparation of an N-substituted 1,3-dihydro-2H-azepin-2-one of the formula:

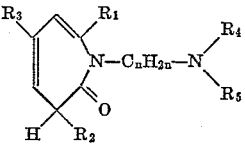

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ and $R_5$ are selected from the group consisting of alkyl of 1 to 6 carbon atoms, inclusive, and alkenyl of 3 to 6 carbon atoms, inclusive, wherein $n$ is 2 to 6, inclusive, and wherein the two N atoms are separated by a chain of at least 2 carbon atoms, which comprises mixing a compound of the formula:

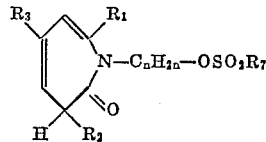

wherein $R_1$, $R_2$, $R_3$, and $n$ are as given above, wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein N and $OSO_2R_7$ are separated by a chain of at least 2 carbon atoms, with an amine of the formula:

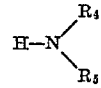

wherein $R_4$ and $R_5$ are as given above, to form said N-substituted 1,3-dihydro-2H-azepin-2-one.

26. A process for the preparation of an N-substituted 1.3-dihydro-2H-azepin-2-one of the formula:

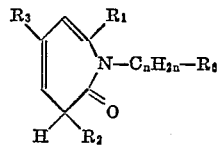

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_6$ is selected from the group consisting of aziridinyl, azetidinyl, pyrrolidinyl, piperidino, hexahydroazepinyl, heptamethyleneimino, octamethyleneimino, morpholino, and thiomorpholino, each having attached as substitutents on carbon atoms thereof zero to three alkyl groups, inclusive, each alkyl group being of 1 to 8 carbon atoms, inclusive, wherein $n$ is 2 to 6, inclusive, wherein N and $R_6$ are separated by a chain of at least 2 carbon atoms, and wherein the nitrogen atom of $R_6$ is attached to a carbon atom of $C_nH_{2n}$, which comprises mixing a compound of the formula:

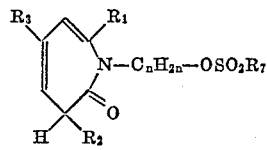

wherein $R_1$, $R_2$, $R_3$, and $n$ are as given above, wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein N and $OSO_2R_7$ are separated by a chain of at least 2 carbon atoms, with an amine of the formula $$H-R_6$$

wherein $R_6$ is as given above and H is attached to the nitrogen atom of $R_6$, to form said N-substituted 1,3-dihydro-2H-azepin-2-one.

27. A process for the preparation of an N-substituted 1,3-dihydro-2H-azepin-2-one of the formula:

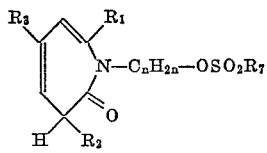

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, wherein $n$ is 2 to 6, inclusive, and wherein N and $OSO_2R_7$ are separated by a chain of at least 2 carbon atoms, which comprises mixing a compound of the formula:

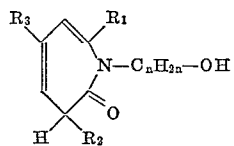

wherein $R_1$, $R_2$, $R_3$, and $n$ are as given above, and wherein N and OH are separated by a chain of at least 2 carbon atoms, with a sulfonyl halide of the formula:

wherein $R_7$ is as given above and X is halide, to form said N-substituted 1,3-dihydro-2H-azepin-2-one.

28. A process for the preparation of an N-substituted 1,3-dihydro-2H-azepin-2-one of the formula:

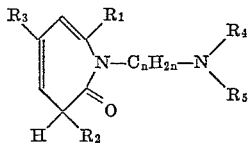

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ and $R_5$ are selected from the group consisting of alkyl of 1 to 6 carbon atoms, inclusive, and alkenyl of 3 to 6 carbon atoms, inclusive, wherein $n$ is 2 to 6, inclusive, and wherein the two N atoms are separated by a chain of at least 2 carbon atoms, which comprises the steps, (1) mixing a compound of the formula:

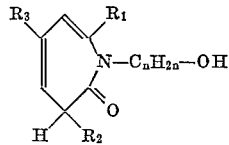

wherein $R_1$, $R_2$, $R_3$, and $n$ are as given above, and wherein N and OH are separated by a chain of at least 2 carbon atoms, with a sulfonyl halide of the formula:

wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein X is halide, and (2) mixing the sulfonic acid ester from step (1) with an amine of the formula:

wherein $R_4$ and $R_5$ are as given above, to form said N-substituted 1,3-dihydro-2H-azepin-2-one.

29. A process for the preparation of an N-substituted 1,3-dihydro-2H-azepin-2-one of the formula:

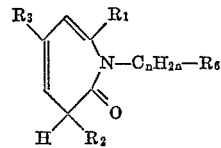

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_6$ is selected from the group consisting of azirindinyl, azetidinyl, pyrrolindinyl, piperidino, hexahydroazepinyl, heptamethylleneimino, octamethyleneimino, morpholino, and thiomorpholino, each having attached as substituents on carbon atoms thereof zero to three alkyl groups, inclusive, each alkyl group being of 1 to 8 carbon atoms, inclusive, wherein $n$ is 2 to 6, inclusive, wherein N and $R_6$ are separated by a chain of at least 2 carbon atoms, and wherein the nitrogen atom of $R_6$ is attached to a carbon atom of $C_nH_{2n}$, which comprises the steps, (1) mixing a compound of the formula:

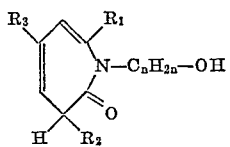

wherein $R_1$, $R_2$, $R_3$ and $n$ are as given above, and wherein N and OH are separated by a chain of at least 2 carbon atoms, with a sulfonyl halide of the formula:

wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, and wherein X is halide, and (2) mixing the sulfonic acid ester from step (1) with an amine of the formula:

wherein $R_6$ is as given above and H is attached to the nitrogen atom of $R_6$, to form said N-substituted 1,3-dihydro-2H-azepin-2-one.

30. A process for the preparation of an N-substituted 1,3-dihydro-2H-azepin-2-one of the formula:

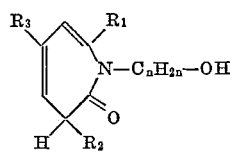

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $n$ is 2 to 6, inclusive, and wherein N and OH are separated by a chain of at least 2 carbon atoms, which comprises the steps, (1) mixing a compound of the formula:

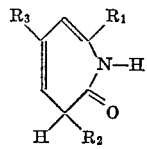

wherein $R_1$, $R_2$, and $R_3$ are as given above, with a material selected from the group consisting of alkali metals, alkali metal hydrides, and alkali metal amides, (2) mixing the metallo-organic reaction product from step (1) with a compound of the formula:

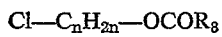

wherein $R_8$ is lower alkyl, $n$ is as given above, and Cl and $OCOR_8$ are separated by a chain of at least 2 carbon atoms, and (3) mixing the heterocyclic ester from step (2) with a deesterification agent, to form said N-substituted 1,3-dihydro-2H-azepin-2-one.

31. A process for the preparation of an N-substituted 1,3-dihydro-2H-azepin-2-one of the formula:

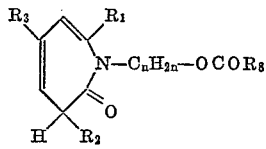

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_8$ is lower alkyl, wherein $n$ is 2 to 6, inclusive, and wherein N and $OCOR_8$ are separated by a chain of at least 2 carbon atoms, which comprises the steps, (1) mixing a compound of the formula:

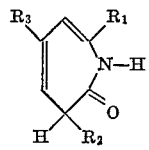

wherein $R_1$, $R_2$, and $R_3$ are as given above, with a material selected from the group consisting of alkali metals, alkali metal hydrides, and alkali metal amides, and (2) mixing the metallo-organic reaction product from step (1) with a compound of the formula:

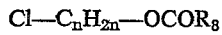

wherein $R_8$ and $n$ are as given above, and Cl and $OCOR_8$ are separated by a chain of at least 2 carbon atoms, to form said N-substituted 1,3-dihydro-2H-azepin-2-one.

32. A compound of the formula:

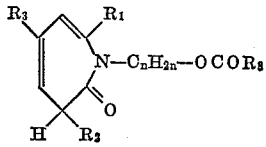

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_8$ is lower alkyl, wherein $n$ is 2 to 6, inclusive, and wherein N and $OCOR_8$ are separated by a chain of at least two carbon atoms.

33. 1,3-dihydro-1-(2-acetoxyethyl)-3,5,7-trimethyl-2H-azepin-2-one.

34. A compound of the formula:

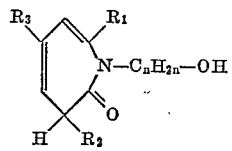

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $n$ is 2 to 6, inclusive, and wherein N and OH are separated by a chain of at least two carbon atoms.

35. 1,3-dihydro-1-(2-hydroxyethyl)-3,5,7-trimethyl-2H-azepin-2-one.

36. A compound of the formula:

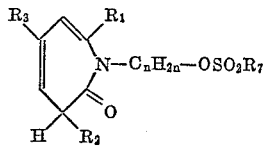

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_7$ is selected from the group consisting of lower alkyl, aryl of 6 to 12 carbon atoms, inclusive, aralkyl of 7 to 11 carbon atoms, inclusive, haloaryl of 6 to 10 carbon atoms, inclusive, and nitroaryl of 6 to 10 carbon atoms, inclusive, wherein $n$ is 2 to 6, inclusive and wherein N and $OSO_2R_7$ are separated by a chain of at least 2 carbon atoms.

37. 1,3-dihydro-1-(2-p-tolylsulfonyloxyethyl)-3-5,7-trimethyl-2H-azepin-2-one.

References Cited by the Examiner

Paquette: JACS, vol. 84, pp. 4978-8 (1962).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,177,204                          April 6, 1965

Leo A. Paquette

It is hereby certified that error appears in the above numbered patent requiring correction and that the said Letters Patent should read as corrected below.

Column 3, line 61, for "2,605,155" read -- 2,606,155 --; column 4, lines 19 to 25, the formula should appear as shown below instead of as in the patent:

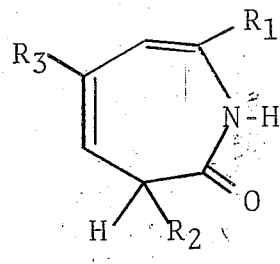

column 7, line 42, strike out "octylpiperidine;"; column 8, line 33, strike out "of"; column 9, line 22, for "1,3 dihydro-" read -- 1,3-dihydro- --; same column 9, after line 58, insert "EXAMPLE 2", as a centered heading; column 10, line 17, for "ree base", in italics, read -- free base --, in italics; line 42, for "N-(2-bromomethyl)-" read -- N-(2-bromoethyl)- --; line 67, for "1,3-dihydro-[2-(di-3-pentenylamino)ethyl]3,5,7-" read -- 1,3-dihydro-1-[2-(di-3-pentenylamino)ethyl]-3,5,7- --; same column 10, line 74, for "-1-[3-di-" read -- -1-[3-(di- --; column 11, line 3, for "methylallylamine" read -- methylallylamino --; line 74, for "-1-(2-dihydro)-1-" read -- -1-(2-dihydro-1- --; column 13, line 48, for "-(3-piperindinopropyl)-", in italics, read -- -(3-piperidinopropyl)- --, in italics; line 56, for "1,3-dhiydro-" read -- 1,3-dihydro- --; line 58, for "$C_{17}H_{29}ClN_2O_2$:" read -- $C_{17}H_{29}ClN_2O$: --; line 63, for "-hexahydroazepin)ethyl]-", in italics, read -- -hexahydroazepinyl)ethyl]- --, in italics; lines 67 and 68, for "(39.8 g." read -- (38.8 g. --; same column 13, line 71, for "0.20 m." read -- 0.20 mm. --; column 14, line 10, for "$C_{17}H_{29}ClN_2O_2$:" read -- $C_{17}H_{29}ClN_2O$: --; line 30, for "-dethyl-5-" read -- -diethyl-5- --; line 36, for "N-(3-iodopropyl(octamethyleneimine;" read -- N-(3-iodopropyl)octamethyleneimine; --; same column 14, line 42, for "free base" read -- free bases --; column 16, line 19, for "1,3-dihydro-1-[-(1-pyrrolidinyl)ethyl]-" read -- 1,3-dihydro-1-[2-(1-pyrrolidinyl)ethyl]- --; line 59, for "0.65 mole)" read -- 0.065 mole) --; same column 16, line 71, for "n-ocetadecyl" read -- n-octadecyl --; column 18, lines 70 to 75, for that portion of the formula reading:

3,177,204

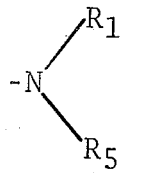   read   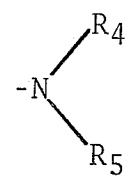

column 23, line 15, for "chloride" read -- chlorides --; column 27, line 51, for "1,3-dihydro-1-(3-hydroxypropyl)3,7-" read -- 1,3-dihydro-1-(3-hydroxypropyl)-3,7- --; column 28, line 1, for "-1-[3-(pyrrolidinyl)propyl]-" read -- -1-[3-(1-pyrrolidinyl)propyl]- --; column 32, line 34, for "1.3-dihydro-" read -- 1,3-dihydro- --.

Signed and sealed this 9th day of August 1966.

(SEAL)
Attest:

ERNEST W. SWIDER
Attesting Officer

EDWARD J. BRENNER
Commissioner of Patents